US011126985B1

(12) United States Patent
Reyelts et al.

(10) Patent No.: US 11,126,985 B1
(45) Date of Patent: Sep. 21, 2021

(54) INTEGRATING FUNCTIONALITY ACROSS MULTIPLE APPLICATIONS

(71) Applicant: Square, Inc., San Francisco, CA (US)

(72) Inventors: Roger Reyelts, Marietta, GA (US); Travis Schmeisser, San Francisco, CA (US); John Joseph LaBanca, Jr., Dunwoody, GA (US); Cynthia Lobb, Marietta, GA (US)

(73) Assignee: Square, Inc., San Francisco, CA (US)

( * ) Notice: Subject to any disclaimer, the term of this patent is extended or adjusted under 35 U.S.C. 154(b) by 193 days.

(21) Appl. No.: 15/446,882

(22) Filed: Mar. 1, 2017

(51) Int. Cl.
*G06F 3/048* (2013.01)
*G06Q 20/20* (2012.01)

(52) U.S. Cl.
CPC ......... *G06Q 20/201* (2013.01); *G06Q 20/202* (2013.01)

(58) Field of Classification Search
CPC ..... G06Q 20/201; G06Q 20/202; G06F 3/048
USPC .......................................................... 705/20
See application file for complete search history.

(56) References Cited

U.S. PATENT DOCUMENTS

| | | | |
|---|---|---|---|
| 6,032,126 A * | 2/2000 | Kaehler | G06Q 20/20 235/381 |
| 6,236,997 B1 | 5/2001 | Bodamer et al. | |
| 6,397,212 B1 | 5/2002 | Biffar | |
| 6,519,568 B1 | 2/2003 | Harvey et al. | |
| 6,917,922 B1 | 7/2005 | Bezos et al. | |
| 7,000,016 B1 | 2/2006 | Vanderbeck et al. | |
| 7,013,290 B2 | 3/2006 | Ananian | |
| 7,099,447 B2 | 8/2006 | McQuilkin et al. | |
| 7,133,882 B1 | 11/2006 | Pringle et al. | |
| 7,225,159 B2 | 5/2007 | DeMello et al. | |
| 7,552,150 B2 | 6/2009 | Olson-Williams | |
| 7,565,310 B2 | 7/2009 | Gao et al. | |
| 7,577,907 B2 | 8/2009 | Vishnia-Shabtai et al. | |
| 7,636,728 B2 | 12/2009 | Novak | |
| 7,738,497 B2 | 6/2010 | Vishnia-Shabtai et al. | |
| 8,065,189 B1 | 11/2011 | Ballaro | |
| 8,065,202 B1 | 11/2011 | Ballaro et al. | |

(Continued)

OTHER PUBLICATIONS

Non-Final Office Action dated Mar. 4, 2016, for U.S. Appl. No. 14/964,198, of Jen, M., et al., filed Dec. 9, 2015.

(Continued)

*Primary Examiner* — Luna Champagne
(74) *Attorney, Agent, or Firm* — Lee & Hayes, P.C.

(57) ABSTRACT

This disclosure describes, in part, techniques for integrating functionality across multiple applications. For instance, an electronic device may operate an application in a first mode of operation, wherein the first mode of operation is associated with a first type of business. Based at least in part on operating the application in the first mode of operation, the electronic device may provide a first user interface that includes one or more first input options associated with the first type of business. The electronic device may then receive input associated with operating the application in a second mode operation, wherein the second mode of operation is associated with a second type of business. Based on the input, the electronic device may operate the application in the second mode of operation, which includes providing a second user interface that includes one or more second input options associated with the second type of business.

20 Claims, 13 Drawing Sheets

(56) References Cited

U.S. PATENT DOCUMENTS

| | | |
|---|---|---|
| 8,069,096 B1 | 11/2011 | Ballaro et al. |
| 8,103,557 B2 | 1/2012 | Hanai et al. |
| 8,103,728 B2 | 1/2012 | Johnson |
| 8,112,317 B1 | 2/2012 | Ballaro et al. |
| 8,271,452 B2 | 9/2012 | Longshaw |
| 8,463,658 B2 | 6/2013 | Racco |
| 8,626,741 B2 | 1/2014 | Vijayakumar et al. |
| 8,635,111 B2* | 1/2014 | Mathew .............. H04W 4/80 705/16 |
| 8,719,142 B1 | 5/2014 | Odom |
| 8,924,559 B2 | 12/2014 | Brown et al. |
| 8,925,808 B2* | 1/2015 | Harrell ............... G06Q 20/12 235/375 |
| 9,021,554 B2 | 4/2015 | Cassidy et al. |
| 9,244,914 B2 | 1/2016 | Trumbull et al. |
| 9,286,375 B2 | 3/2016 | Rowley |
| 9,292,587 B2 | 3/2016 | Kann et al. |
| 9,557,889 B2 | 1/2017 | Raleigh et al. |
| 9,589,291 B1 | 3/2017 | Yalamanchi |
| 9,607,058 B1 | 3/2017 | Gupta et al. |
| 9,792,597 B1 | 10/2017 | Jen et al. |
| 9,916,563 B1 | 3/2018 | Labanca, Jr. et al. |
| 9,996,605 B2 | 6/2018 | Charron et al. |
| 10,083,198 B2 | 9/2018 | Yang |
| 10,177,976 B2 | 1/2019 | Berly et al. |
| 10,394,758 B2 | 8/2019 | Xing |
| 10,540,634 B1 | 1/2020 | Labanca, Jr. et al. |
| 10,636,021 B1 | 4/2020 | Jen et al. |
| 10,832,307 B1 | 11/2020 | Reyelts et al. |
| 2002/0074344 A1* | 6/2002 | Long ..................... G07F 9/02 222/71 |
| 2002/0077914 A1 | 6/2002 | Shatzkin et al. |
| 2003/0028451 A1 | 2/2003 | Ananian |
| 2004/0225509 A1 | 11/2004 | Andre |
| 2005/0222815 A1 | 10/2005 | Tolly |
| 2006/0085294 A1 | 4/2006 | Boemer et al. |
| 2007/0156538 A1 | 7/2007 | Peter et al. |
| 2007/0185785 A1 | 8/2007 | Carlson et al. |
| 2008/0243641 A1 | 10/2008 | Leno |
| 2009/0171811 A1 | 7/2009 | Peter et al. |
| 2009/0265251 A1 | 10/2009 | Dunlap et al. |
| 2010/0023391 A1 | 1/2010 | Hudetz et al. |
| 2010/0057554 A1 | 3/2010 | Lanford |
| 2010/0070376 A1 | 3/2010 | Proud et al. |
| 2011/0258083 A1 | 10/2011 | Ren |
| 2012/0110311 A1* | 5/2012 | Kobres .................. G06Q 30/02 713/2 |
| 2013/0191230 A1* | 7/2013 | Edwards ............... G06Q 20/20 705/16 |
| 2014/0068494 A1* | 3/2014 | Petersen ........... H04M 1/72412 715/778 |
| 2014/0094292 A1* | 4/2014 | Nguyen ................. G07F 17/32 463/26 |
| 2014/0244416 A1 | 8/2014 | Venkat et al. |
| 2015/0154682 A1 | 6/2015 | Ram et al. |
| 2015/0356484 A1 | 12/2015 | Velusamy et al. |
| 2016/0162913 A1 | 6/2016 | Linden et al. |
| 2016/0171540 A1 | 6/2016 | Mangipudi et al. |
| 2017/0118301 A1* | 4/2017 | Kouru .................... H04L 67/06 |
| 2017/0221060 A1* | 8/2017 | Boyd ................. G06Q 20/4014 |
| 2020/0242579 A1 | 7/2020 | Jen et al. |

OTHER PUBLICATIONS

Non-Final Office Action dated Dec. 1, 2016, for U.S. Appl. No. 14/964,198, of Jen, M., et al., filed Dec. 9, 2015.

Final Office Action dated Apr. 4, 2017, for U.S. Appl. No. 14/964,198, of Jen, M., et al., filed Dec. 9, 2015.

Non-Final Office Action dated May 10, 2017, for U.S. Appl. No. 15/446,975, of Labanca, J.J., et al., filed Mar. 1, 2017.

Notice of Allowance dated Jun. 16, 2017, for U.S. Appl. No. 14/964,198, of Jen, M., et al., filed Dec. 9, 2015.

Notice of Allowance dated Oct. 18, 2017, for U.S. Appl. No. 15/446,975, of Labanca, J.J., et al., filed Mar. 1, 2017.

Non-Final Office Action dated Mar. 8, 2019, U.S. Appl. No. 15/447,037, of Reyelts, R., et al., filed Mar. 1, 2017.

Non-Final Office Action dated Jun. 11, 2019, U.S. Appl. No. 15/447,037, of Reyelts, R., et al., filed Mar. 1, 2017.

Advisory Action dated Aug. 9, 2019, U.S. Appl. No. 15/447,037, of Reyelts, R., et al., filed Mar. 1, 2017.

Non-Final Office Action dated Aug. 22, 2019, U.S. Appl. No. 15/712,035, of Jen, M., et al., filed Sep. 21, 2017.

Notice of Allowance dated Sep. 11, 2019, U.S. Appl. No. 15/874,717, of Labanca, J.J., et al., filed Jan. 18, 2018.

How to Conduct Competitive Reaseach; Who are your Closest rivals and how do they talk about themselves, as well as your Company? It's time to find out. By: Inc. Staff. May 10, 2010 (Year: 2010).

Non-Final Office Action dated Nov. 1, 2019, U.S. Appl. No. 15/447,037, of Reyelts, R., et al., filed Mar. 1, 2017.

Notice of Allowance dated Dec. 12, 2019, U.S. Appl. No. 15/712,035, of Jen, M., et al., filed Sep. 21, 2017.

Advisory Action dated Jun. 2, 2020, U.S. Appl. No. 15/447,037, of Reyelts, R., et al., filed Mar. 1, 2017.

Notice of Allowance dated Jul. 2, 2020, U.S. Appl. No. 15/447,037, of Reyelts, R., et al., filed Mar. 31, 2017.

Final Office Action dated Mar. 20, 2020, U.S. Appl. No. 15/447,037, of Reyelts, R., et al., filed Mar. 1, 2017.

* cited by examiner

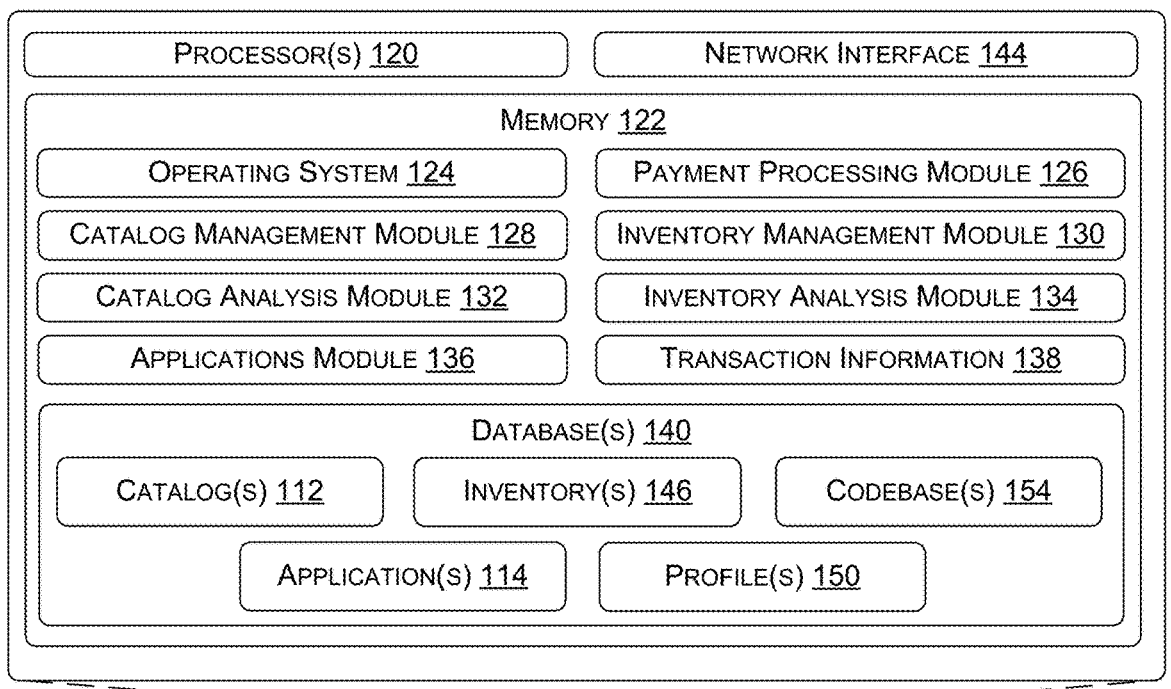
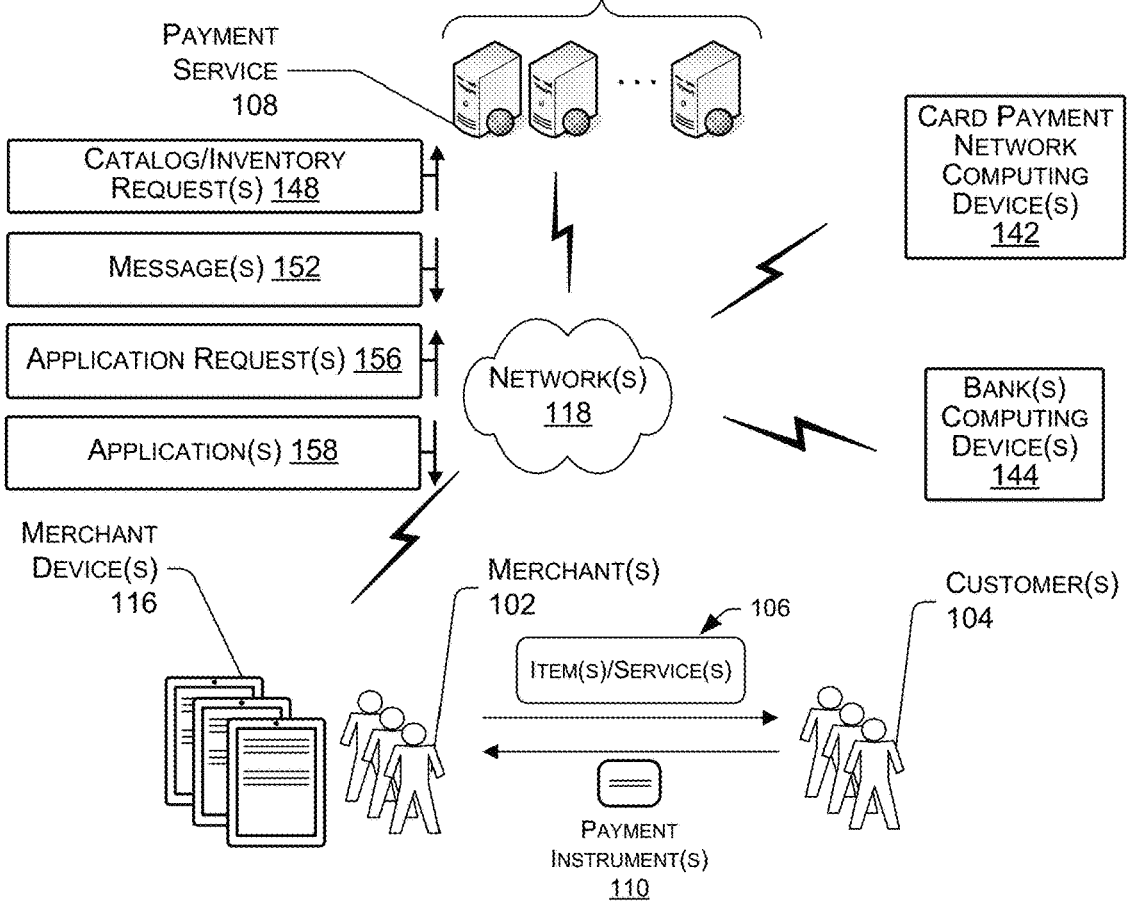
FIG. 1

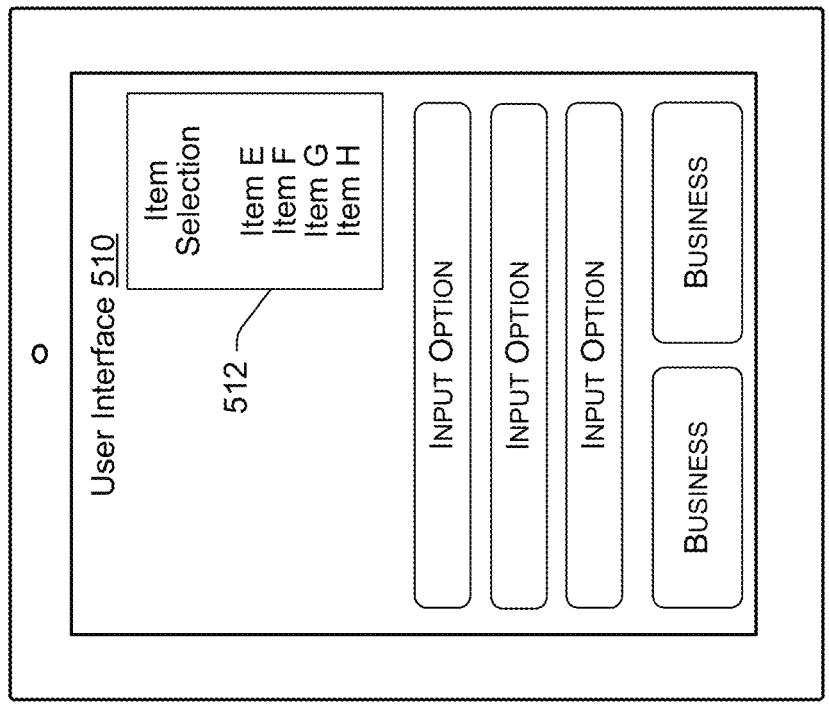
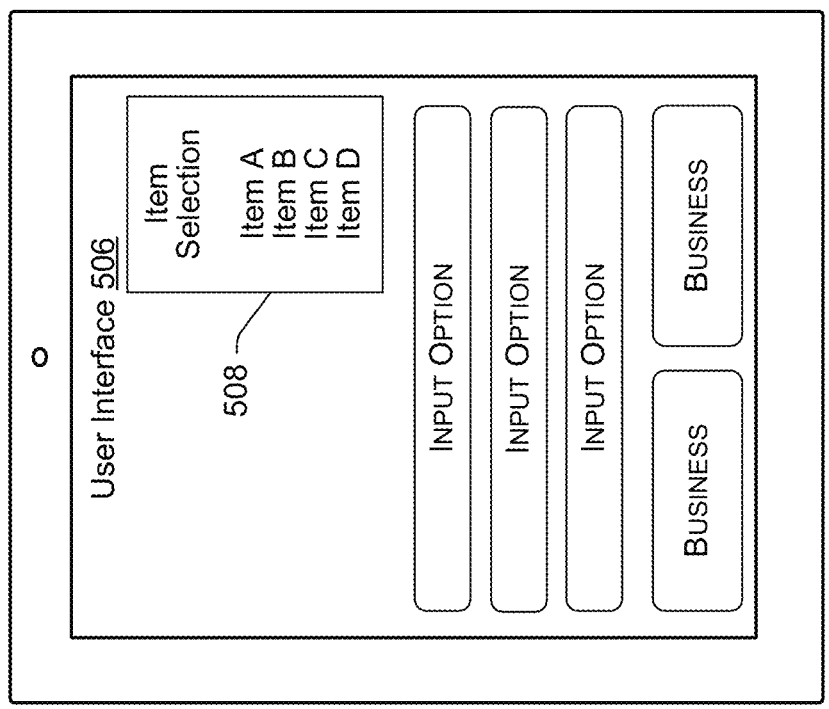
FIG. 5

INTEGRATING FUNCTIONALITY ACROSS MULTIPLE APPLICATIONS

BACKGROUND

Merchants may conduct transactions for items and services with customers. During a transaction between a merchant and a customer, the merchant can use a point-of-sale (POS) device to input information associated with the transaction. For example, if a retail merchant offers items for acquisition to customers, the retail merchant can input, into a POS device, information describing items that a customer is acquiring from the retail merchant during a transaction. For another example, if a services merchant offers services for acquisition to customers, the services merchant can input, into a POS device, information describing services that a customer is acquiring from the services merchant during a transaction.

To input the information, the POS device utilized by the retail merchant may execute a retail application that provides a specific user interface for inputting the information describing the items. Additionally, the POS device utilized by the services merchant may execute a different, services application that provides a specific user interface for inputting the information describing the services. However, since the information describing the items differs from the information describing the services, the retail application being utilized by the POS device of the retail merchant will be insufficient to the services merchant and/or the services application being utilized by the POS device of the services merchant will be insufficient to the retail merchant.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an example environment in which techniques discussed herein may be implemented.

FIG. 5 illustrates an example of customizing user interfaces for respective merchants.

DETAILED DESCRIPTION

Figure 2:
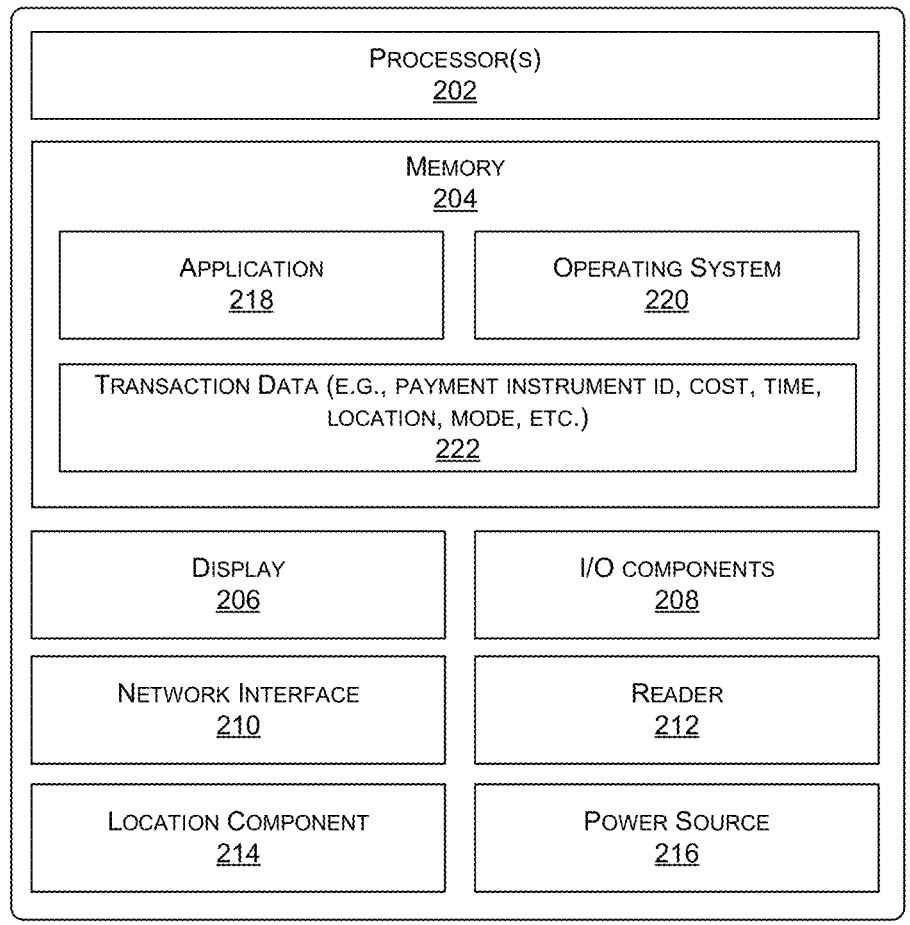
FIG. 2 illustrates components of a merchant device.

This disclosure describes, in part, techniques for analyzing and updating merchants' catalogs, and techniques for integrating functionality across multiple applications. In some instances, a payment service may offer a variety of services to help merchants (also referred to as "entity" for a single merchant or "entities" for more than one merchant) streamline their businesses. For instance, the payment service may provide tools to enable merchants to manage aspects of their businesses. As an example, the payment service may provide tools for maintaining a catalog (i.e., catalog data structures) and/or an inventory (i.e., inventory data structures). A tool for maintaining a catalog may enable a merchant to access and manage a database storing data associated with items (and/or data associated with services) that the merchant has available for acquisition (i.e., a catalog). In at least one example, as described below, the catalog may include a plurality of data items and a data item of the plurality of data items may represent an item that the merchant has available for acquisition.

The data item may identify (e.g., provide indication of) the item and may be associated with additional data that represents information about the item. For instance, the additional data may include attribute(s) of the item, a price of the item, a discount available for the item, taxes applicable to the item, a location of the item (e.g., where the item is located in a warehouse), image(s) of the item, etc. In at least one example, attribute(s) may correspond to variants of the item and may be represented by attribute values. A creator of a catalog may specify attribute names and allowed values for each of the attributes, dependent on the actual characteristics of an item. For instance, attribute names may include "color" and "size" and attribute values may include "red" or "green" or "small," "medium," or "large," for each attribute name, respectively.

The payment service may provide various access points to a merchant so that the merchant can access and manage the merchant's catalog. As a non-limiting example, the payment service may enable a merchant to access and manage its catalog via a web interface, a user interface presented via a point-of-sale (POS) device associated with the merchant, etc. In at least one example, the catalog may be shared with potential customers and/or may be utilized for creating purchase orders for the items. Additionally, or alternatively, descriptive information about the items may be imported for inclusion in catalogs associated with other merchants.

Although the above describes that a catalog may enable a merchant to access and manage a database storing data associated with items, in some instances, the catalog may further enable the merchant to access and manage a database (and/or the same database) storing data associated with services. For instance, the catalog may include a plurality of data services and a data service of the plurality of data services may represent a service that the merchant has available for acquisition. In some instances, the data service may identify the service and may be associated with additional data that represents information about the service. For instance, the additional data may include information describing how the service is performed, a price of the service, etc.

Additionally, or alternatively, the payment service may provide a merchant with a tool for managing its inventory. That is, the payment service may provide inventory tracking and reporting via such a tool. A tool for managing inventory may enable a merchant to access and manage a database storing data associated with a quantity of each item that the merchant has available (i.e., an inventory). The merchant may update the inventory following an inventory activity (i.e., where entities associated with the merchant manually determine quantities of each of the items that the merchant has available), upon receiving new item(s) that are to be offered for acquisition, after item(s) are acquired by customers, etc. The payment service may then update the inventory based on information received from the merchant (e.g., the POS device) and/or other sources and/or systems. For instance, in some examples, the payment service may track individual instances of an item as the instance moves through merchant(s) associated with a product supply chain.

In at least one example, the inventory may include additional information associated with items in the inventory. For instance, data associated with such additional information may include current ownership (i.e., which merchant in the product supply chain has the item), location, sale-related events, etc. In some examples, the catalog may cross-reference the inventory. That is, in some examples, the additional data associated with an item may include a quantity associated with the item as indicated in the inventory and/or additional information that is available via the inventory.

The payment service may provide various access points to a merchant so that the merchant can access and manage its inventory. As a non-limiting example, the payment service may enable a merchant to access and manage its inventory via a web interface, a user interface presented via the POS device, etc. In at least one example, the inventory may be useful for generating inventory reports regarding items in the inventory of a merchant.

In some instances, the payment service may analyze and update data across catalogs and inventories associated with merchants. To analyze and update the data, in some instances, the payment service may provide a merchant with recommendations based on catalogs and/or inventories associated with other merchants. For instance, the payment service may determine a type of business (e.g., classification) associated with the merchant. In some examples, the type of business may include retail, restaurant, services, or the like. In some examples, the type of business may be more specific to the merchant. For instance, the payment service may determine the type of business associated with the merchant using a merchant category code (MCC) (and/or some other type of identifier) associated with the merchant.

The payment service can then identify one or more other merchants that are also associated with the type of business. For instance, the payment service may store, for each merchant, information describing the type of business the respective merchant is associated with. In some instances, the payment service stores the information in a merchant profile associated with the respective merchant. The payment service can then use the merchant profiles to identify the one or more other merchants that are also associated with the type of business.

After identifying the one or more other merchants, the payment service can use catalogs and/or inventories associated with the one or more other merchants to generate and provide recommendations for the merchant. For instance, the payment service can utilize one or more algorithms to analyze catalogs associated with the other merchants. To analyze the catalogs, the one or more algorithms may analyze data (e.g., the data items and/or data services) associated with each of the catalogs in order to identify items (and/or similarly services) associated with the respective catalogs. Using the analysis, the payment service can identity items offered for acquisition by the one or more other merchants, either at the merchants' respective physical establishments, at the merchants' online marketplaces, and/or both.

The payment service can then use the identified items to determine which items to recommend to the merchant. In some instances, the payment service may recommend items that the merchant does not already offer for acquisition. For instance, the payment service can analyze the catalog associated with the merchant to determine which items the merchant offers for acquisition at a physical establishment of the merchant, an online marketplace associated with the merchant, and/or both. The payment service can then determine to recommend one or more of the items that were identified during the analysis above, which the merchant does not already offer for acquisition.

In some instances, the payment service may recommend one or more of the identified items based on data associated with the other merchants. For instance, the payment service may recommend an identified item when a number of merchants that offer the item for acquisition exceeds a merchant threshold. For example, the payment service may recommend the identified item when ten merchants, one hundred merchants, ten percent of the other merchants, half of the other merchants, or the like offer the identified item for acquisition. In some instances, the payment service may use geographical locations of the other merchants when recommending an identified item. For instance, the payment service may recommend an identified item when other merchants that are proximate to the merchant (e.g., within a block, mile, etc.) offer the identified item for acquisition.

In some instances, the payment service may recommend one or more of the identified items based on transaction information. For instance, the payment service may store transaction information associated with transactions conducted between merchants and customers. The transaction information for a respective transaction can indicate an identifier of the merchant, an identifier (e.g., name) of the customer, payment information associated with a payment instrument used by the customer during the respective transaction, item(s)/service(s) acquired by the customer during the respective transaction, a cost of the item(s)/service(s) acquired by the customer during the respective transaction, a time, place and date of the respective transaction, and so forth.

To recommend one or more items based on the transaction information, the payment service can analyze the transaction information using one or more algorithms that identify which of the identified items includes sales data that is greater than a threshold. In some instances, the threshold can correspond to a number of items (e.g., quantity) acquired by customers during respective transactions. For instance, the threshold can include ten items, fifty items, one hundred items, or the like. In some instances, the threshold can correspond to a number of items (e.g., quantity) acquired by customers during a respective time period. For instance, the threshold can include ten items per week, one hundred items per month, or the like. The payment service can then determine to recommend one more of the identified items that exceed the threshold.

Additionally to, or alternatively from, using the threshold, the payment service can utilize correlations between items in order to recommend one or more of the identified items. For instance, the payment service can analyze the catalog of the merchant in order to determine that the merchant offers a specific item for acquisition. Additionally, the payment service can analyze the catalogs of the other merchants to determine that the other merchants offer the specific item for acquisition. The payment service can analyze the transaction data to determine that customers that acquire the specific item from the other merchants tend to also acquire an additional item, either during the same transaction and/or during a previous/subsequent transaction. Based on the determination, the payment service can determine to recommend that the merchant offer the additional item for acquisition.

In addition to recommending items (and/or services), the payment service can recommend quantities of items for merchants to acquire. For instance, after recommending the item to the merchant, the payment service can utilize one or more algorithms to analyze inventories of the one or more other merchants in order to determine the quantity for the item. In some instances, the quantity can include the lowest quantity a respective merchant keeps available, a highest quantity a respective merchant keeps available, an average quantity a respective merchant keeps available, an average quantity the one or more other merchants keep available, a quantity that is between the lowest quantity and the highest quantity, or the like.

In some instances, in addition to, or alternatively from, analyzing the inventories, the payment service can analyze the transaction information to determine the quantity. For instance, the payment service can utilize one or more algorithms that analyze the transaction information to determine sales for the item at respective merchants. The payment service can then determine the quantity based on the sales. For instance, the payment service can determine the quantity based on the lowest sales at a respective merchant, the highest sales at a respective merchant, average sales for the one or more other merchants, or the like.

The payment service can then generate one or more messages for the merchant that recommend the item and/or the quantity of the item. For instance, the payment service can generate a message that recommends the item. The payment service can then send the message to a POS device associated with the merchant. Based on sending the message, the payment service can receive a message from the POS device that requests adding the item to the catalog of the merchant. The payment service can then store an indication of the item in association with the catalog. For instance, the payment service can store a data item that represents the item in the catalog.

Additionally, the payment service can generate a message that recommends that the merchant acquire a specific quantity of the item. The payment service can then send the message to the POS device associated with the merchant. Later, after the merchant acquires the specific quantity of the item (and/or a different quantity), the payment service can receive a message from the POS device that indicates a quantity of the item that the merchant has available for acquisition. The payment service can then update the inventory of the merchant to indicate the quantity.

In some instances, the payment service may further integrate functionality across multiple applications in order to provide merchants with applications that are customized for each respective merchant. For instance, the payment service may store multiple applications that merchants can use to conduct transactions with customers. In some instances, each application may be associated with a type of business. For example, the payment service may store a first application that is associated with retail merchants (e.g., merchants that sell items, such as clothes, groceries, sporting equipment, etc.), a second application that is associated with merchants that provide services (e.g., mechanics, doctors, cleaning services, etc.), and a third application that is associated with restaurant merchants (e.g., restaurants, bars, etc.).

In some instances, each application may include functionality based on the type of business that the respective application is associated with. For instance, and using the example above with the three separate applications, the retail application may include functionality that causes a POS device to provide a retail user interface. The retail user interface may include one or input options that a merchant can utilize to input information describing one or more items that are being acquired by a customer during a transaction.

Additionally, the services application can include functionality that causes a POS device to provide a services user interface. The services user interface may include one or input options that a merchant can utilize to input information describing one or more services that are being acquired by a customer during a transaction. Furthermore, the restaurant application can include functionality that causes a POS device to provide a restaurant user interface. The restaurant user interface may include one or input options that a merchant can utilize to input information describing one or more food menu items that are being acquired by a customer during a transaction.

In some instances, however, merchants may be associated with more than one type of business. For instance, a merchant's primary business purpose may be associated with providing services to customers, such as by providing customers with golf lessons, but the merchant may further offer items for sale to customers, such as golf equipment. As such, the payment service may generate an application that is customized for the merchant's specific business and/or provide an application that is customized for merchant's specific business.

For instance, the payment service may generate customized applications using a codebase that includes the code from each of the applications above. For example, each of the retail application, services application, and restaurant application may be built using a respective code that provides the respective application with the functionality described above. For instance, the retail application may be built using first code that provides the retail application with the functionality required by retail merchants to conduct transactions, the services application may be built using a second code that provides the services application with the functionality required by merchants that provide services during transactions, and the restaurant application may be built using a third code that provides the restaurant application with the functionality required by restaurant merchants to conduct transactions.

The payment service can then generate customized applications using the codebase. For example, the payment service can generate a customized retail application that includes at least some of the first code from the retail application and at least some of the second code from the services application. For another example, the payment service can generate a customized retail application that includes at least some of the first code from the retail application, at least some of the second code from the services application, and at least some of the third code from the restaurant application. The payment service can perform similar processes for generating customized services applications and customized restaurant applications.

The customized retail application can include functionality that causes a POS device to operate in two or more modes of operation, where each mode of operation is associated with a type of business. For instance, and using the example above where the payment service generates a customized retail application that includes at least some of the first code from the retail application, at least some of the second code from the services application, and at least some of the third code from the restaurant application, the POS device can execute the customized retail application during a transaction between a merchant and a customer.

During execution of the customized retail application, the POS device may initially operate in a first mode of operation that is associated with retail since the customized application is a "retail application." While operating in the first mode of operation, the POS device may provide a retail user interface that includes one or more input options for inputting information describing items that the customer is acquiring from the merchant during the transaction. The POS device may receive the input via the retail user interface, and then update the retail user interface to indicate each of the items being acquired by the customer during the transaction. In some instances, after receiving the input, the POS device may attempt to authorize the transaction for a cost of the items. However, in some instances, the customer may further acquire services from the merchant during the transaction.

For instance, the POS may then receive input associated with transitioning from the first mode of operation to a second mode of operation, which may be associated with services. In some instances, the input may include a selection of a graphical icon provided by the retail user interface. Based on receiving the input, the POS device may transition from operating in the first mode of operation to operating in the second mode of operation. While operating in the second mode of operation, the POS device may provide a services user interface that includes one or more input options for inputting information describing services that the customer is acquiring from the merchant. The POS device may receive the input via the services user interface, and then update the services user interface to indicate each of the services being acquired by the customer during the transaction.

In the example, the POS device can perform a similar process to transition from operating in the second mode of operation to operating in a third mode of operation that is associated with restaurants. While operating in the third mode of operation, the POS device may provide a restaurant user interface that includes one or more input options for inputting information describing restaurant menu items that the customer is acquiring from the merchant. The POS may receive input via the restaurant user interface, and then update the restaurant user interface to indicate each of the menu items being acquired by the customer during the transaction.

The example above describes that a primary mode operation for the customized retail application is associated with a retail type of business. In some instances, this may be because, even though the customized retail application is generated using a codebase that includes code from each of the applications described above, the primary business purpose for the customized retail application is for retailer merchants. For instance, retailer merchants, whose primary business purpose is the selling of retail items, may access the payment service to download the customized retail application since the application is customized for retail merchants (i.e., the primary mode of operation includes the functionality associated with the retail application).

In some instances, the payment service may generate and/or provide customized applications for other types of business (e.g., services, restaurants, etc.). For instance, the payment service may generate a customized services application using the same codebase as the customized retail application. However, the primary mode of operation for the customized services application is for merchants that primarily offer services to customers. For instance, merchants whose primary business purpose is offering services to customers may access the payment service to download the customized services application since the application is customized for such merchants (i.e., the primary mode of operation includes the functionality associated with the services application described above).

In some instances, the merchant may set the primary mode of operation for a customized application. For instance, the merchant may use a POS device to download an application that is built using the codebase. While executing the application, the POS device may receive input from the merchant that indicates the primary business purpose. For instance, the input may indicate that the merchant is primarily a retail merchant, a merchant that provides services, or a restaurant merchant. Based on the input, the POS device may cause the customized application to set the primary mode of operation based on the primary business purpose.

Although above describes integrating functionality across multiple applications that are associated with types of business that include retail, services, and restaurants, the above techniques can be used to integrate functionality across applications that are associated with other types of business. For instance, the payment service may provide applications that are associated with various MCCs. The payment service can then use the techniques described above to generate customized applications using a codebase that includes code from each of MCC specific applications.

By using the techniques described above, the payment service is capable expanding the functionality of a POS device. For instance, the POS device can download and execute a customized application that provides the POS with various modes of operation, where each mode of operation corresponds to a specific type of business. For example, a customized application can provide the POS device with functionality that is specific to a first type of business, such as retail, by causing the POS device to provide a user interface for inputting information associated with items that the merchant offers. Additionally, the customized application can provide the POS device with functionality that is specific to a second type of business, such as services, by causing the POS device to provide a user interface for inputting information associated with services that the merchant offers.

As will be discussed in greater detail below, each user interface includes various input options for inputting information associated with the type of business. For instance, the user interface associated with retail may include input options that the merchant can use to input an identity of an item, a quantity for the item, physical properties of the item (e.g., size, color, etc.), or the like. The user interface associated with services may include input options that the merchant can use to input an identity of the service, an appointment time for the service, notes specific to how the service is to be performed, or the like. Furthermore, a user interface associated with restaurants may include input options that the merchant can use to input an identity of a menu item, a quantity for the menu item, notes on how to prepare the menu item, sides to include with the menu item, or the like.

It should be noted that, as described herein, messages can include any type of electronic communication that electronic devices can send and receive with other electronic devices. For instance, a message can include an email message, a short message service (SMS), multimedia messages (MMS), a voicemail message, an audio signal, or any other type of electronic communication that an electronic device can send to another electronic device. In some instances, an electronic device may use messages to send indications, notifications, alerts, and/or requests to another electronic device.

FIG. 1 illustrates an example environment 100 that includes merchant(s) 102 conducting transactions with customer(s) 104 for item(s)/service(s) 106, as well as a payment service 108 to authorize payment instrument(s) 110 of the customer(s) 104 for the transactions. FIG. 1 further illustrates that the payment service 108 analyzes and updates data between catalog(s) 112 associated with the merchant(s) 102. Furthermore, FIG. 1 illustrates that the payment service 108 generating and/or providing application(s) 114 for the merchant(s) 102 to utilize during the transactions.

As used in herein merchant device(s) 116 may comprise any sort of mobile or non-mobile devices (e.g., electronic device(s)) that include instances of application(s) 114 that executes on the respective devices. The application(s) 114 may provide POS functionality to the merchant device(s) 116 to enable merchant(s) 102 (e.g., owners, employees, etc.) to at least accept payments from the customer(s) 104. In some types of businesses, the merchant device(s) 116 may correspond to a store or other place of business of the merchants, and thus, may be a fixed location that typically does not change on a day-to-day basis. In other types of businesses, however, the location of the merchant device(s) 116 may change from time to time, such as in the case that the merchant(s) 102 operate a food truck, is a street vendor, is a cab driver, etc., or has an otherwise mobile business, e.g., in the case the merchant(s) 102 sell items at buyer's homes, places of business, and so forth. In either of the examples above, the place of business of the merchant(s) 102 may be referred to a physical establishment.

Additionally, as used herein, a merchant 102 (also referred to as an "entity") may include any business engaged in the offering of items (e.g., goods) or services for acquisition by customer(s) 104. Actions attributed to a merchant 102 may include actions performed by owners, employees, or other agents of the merchant 102, and thus no distinction is made herein unless specifically discussed. In addition, as used herein, a customer 104 may include any entity that acquires items or services from a merchant 102, such as by purchasing, renting, leasing, borrowing, licensing, or the like. Hereinafter, items and/or services offered by merchants 102 may be referred to solely as items. Thus, a merchant 102 and a customer 104 may interact with each other to conduct a transaction in which the customer 104 acquires an item from a merchant 102, and in return, the customer 104 provides payment to the merchant 102.

As used herein, a transaction may include a financial transaction for the acquisition of items and/or services that is conducted between customer(s) 104 and merchant(s) 102. For example, when paying for a transaction, the customer 104 can provide the amount that is due to the merchant 102 using cash or other payment instrument 110 (e.g., a debit card, a credit card, a stored-value or gift card, a check, through an electronic payment application on a device carried by the customer 104, or the like). The merchant 102 can interact with the merchant device(s) 116 to process the transaction, such as by inputting (e.g., manually, using a magnetic card reader or an RFID reader, etc.) identifiers (e.g., payment information, such as a card number, account number, or any other account information) associated with the payment instrument 110. For example, a payment instrument 110 of the customer 104 may include one or more magnetic strips for providing card and customer information when swiped in a card reader. In other examples, the payment instrument 110 may include other types of payment cards may be used, such as smart cards having a built-in memory chip that is read by the device when the card is "dipped" into the reader, a radiofrequency identification tag, or so forth.

During a transaction between a merchant 102 and a customer 104, the merchant device(s) 116 can determine transaction information describing the transaction, such as the payment information of the payment instrument 110, an amount of payment received from the customer 104, the item(s)/service(s) 106 acquired by the customer 104, a time, place and date of the transaction, a card network associated with the payment instrument 110, an issuing bank of the payment instrument 110, a name of the customer 104, and so forth. The merchant device(s) 116 can send the transaction information to the payment service 108 over a network 118, either substantially contemporaneously with the conducting of the transaction (in the case of online transactions) or later when the device is in the online mode (in the case offline transactions).

The payment service 108 may include one or more processors 120 and memory 122, which may store an operating system 124, a payment processing module 126, a catalog management module 128, an inventory management module 130, a catalog analysis module 132, an inventory analysis module 134, an applications module 136, transaction information 138, and database(s) 140. The payment processing module 126 may function to receive the information regarding the transaction from the merchant device(s) 116 and attempt to authorize the payment instrument 110 used to conduct the transaction. The payment processing module 126 may then send an indication of whether the payment instrument 110 has been approved or declined back to the merchant device(s) 116.

Generally, when a customer 104 and a merchant 102 enter into an electronic payment transaction, the transaction is processed by electronically transferring funds from a financial account associated with the customer 104 to a financial account associated with the merchant 102. As such, the payment processing module 126 may communicate with one or more computing devices of a card network (or "card payment network") 142, e.g., MasterCard®, VISA®, over the network 118 to conduct financial transactions electronically. The payment processing module 126 can also communicate with one or more computing devices of one or more banks 144, processing/acquiring services, or the like over the network 118. For example, the payment processing module 126 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instrument(s) 110 to customer(s) 104, and may pay acquiring banks for purchases made by customer(s) 104 to which the issuing bank has issued the payment instrument(s) 110. Accordingly, in some examples, the computing device(s) of an acquiring bank may be included in the card payment network and may communicate with the computing devices of a card-issuing bank to obtain payment. Further, in some examples, a customer 104 may use a debit card instead of a credit card, in which case, the bank computing device(s) of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In the example environment 100 of FIG. 1, the payment service 108 may manage catalog(s) 112 and inventory(s) 146 for merchant(s) 102. For instance, the catalog management module 128 may manage catalog(s) 112 stored in the database(s) 140. That is, in at least one example, the catalog management module 128 may receive instructions (e.g., catalog/inventory request(s) 148) associated with modifying catalog(s) 112 and may update catalog(s) 112 based on the instructions. For instance, a merchant device 116 may send instructions to the payment service 108 which may identify a modification that is to be made to a catalog 112 associated with a merchant 102. As a result, the catalog management module 128 may modify the catalog 112 consistent with the instructions. In some examples, the instructions may be received from devices associated with merchants (e.g., merchant device(s) 116). In other examples, the instructions may be received from third-party sources or systems.

Additionally, the inventory management module 130 may manage inventory(s) 146 stored in the database(s) 140. That is, in at least one example, the inventory management module 130 may receive instructions (e.g., catalog/inventory request(s) 148) associated with modifying inventory(s) 146 and may update respective inventory(s) 146 based on the instructions. For instance, a merchant device 116 may send instructions to the payment service 108 which may identify a modification that is to be made to an inventory 146 associated with a merchant 102. As a result, the inventory management module 130 may modify the inventory 146 consistent with the instructions. In some examples, the instructions may be received from devices associated with merchants (e.g., merchant device(s) 116). In other examples, the instructions may be received from third-party sources or systems.

In the example of FIG. 1, the payment service 108 may further analyze and update data within catalog(s) 112 associated with merchant(s) 102. For instance, the catalog analysis module 132 of the payment service 108 may determine a type of business associated with a first merchant 102. In some examples, the type of business may include retail merchant, restaurant merchant, a services merchant (e.g., merchant that provides services), or the like. In some examples, the type of business may be more specific to the first merchant 102. For instance, the catalog analysis module 132 may determine the type of business associated with the first merchant 102 using a MCC and/or other type of code that defines the first merchant's 102 business. Still, in some examples, the type of business may be based on specific items/services offered for acquisition by the first merchant 102. For instance, if the first merchant 102 offers sporting equipment for acquisition, the type of business may be a sporting equipment retailer.

The catalog analysis module 132 can then identify one or more second merchant(s) 102 that are also associated with the type of business. For instance, the payment service 108 may store, for each merchant 102, information describing the type of business the respective merchant 102 is associated with. In some instances, the payment service 108 stores the information in profile(s) 150 associated with the merchant(s) 102. The catalog analysis module 132 can then analyze the profiles(s) 150 to identify the one or more second merchant(s) 102 that are also associated with the type of business.

After identifying the one or more second merchant(s) 102, the catalog analysis module 132 can then use catalog(s) 112 associated with the one or more second merchant(s) 102 to generate and provide recommendations for the first merchant 102. For instance, the catalog analysis module 132 can utilize one or more algorithms to analyze the catalog(s) 112 associated with the one or more second merchant(s) 102. To analyze the catalog(s) 112, the one or more algorithms may analyze data (e.g., the data item) associated with each of the catalog(s) 112 in order to identify items (and/or similarly services) that are associated with the respective catalog(s) 112. Based the analysis, the catalog analysis module 132 can identity items offered for acquisition by the one or more second merchant(s) 102, either at the merchants' respective physical establishments, at the merchants' online marketplaces, and/or both.

The catalog analysis module 132 can then use the identified items to determine which items to recommend to the first merchant 102. In some instances, the catalog analysis module 132 may recommend items that the first merchant 102 does not already offer for acquisition. For instance, the catalog analysis module 132 can analyze, using a similar process as above, the catalog 112 associated with the first merchant 102 to determine which items the first merchant 102 offers for acquisition at a physical establishment of the first merchant 102, an online marketplace associated with the first merchant 102, and/or both. The catalog analysis module 132 can then determine to recommend one or more of the items that were identified during the analysis of the catalog(s) 112 of the one or more second merchants 102, which the first merchant 102 does not already offer for acquisition.

In some instances, the payment service 108 may recommend one or more of the identified items based data associated the one or more second merchants 102. For instance, the payment service 108 may recommend an identified item when a number of merchants that offer the item for acquisition exceeds a merchant threshold. For example, the payment service 108 may recommend the identified item when ten merchants, one hundred merchants, ten percent of the second merchants 102, half of the second merchants 102, or the like offer the identified item for acquisition. In some instances, the payment service 108 may use geographical locations of the second merchants 102 when recommending an identified item. For instance, the payment service 108 may recommend an identified item when other merchants that are proximate to the first merchant 102 (e.g., within a block, mile, etc.) offer the identified item for acquisition.

In some instances, the catalog analysis module 132 may recommend one or more of the identified items based on transaction information 138. For instance, the payment service 108 may store transaction information 138 associated with transactions conducted between merchant(s) 102 with customer(s) 104. The transaction information 138 for a respective transaction can indicate an identifier of a merchant 102, an identifier (e.g., name) of a customer 104, payment information associated with a payment instrument 110 used by the customer 104 during the respective transaction, item(s)/service(s) 106 acquired by the customer 104 during the respective transaction, a cost of the item(s)/service(s) 106 acquired by the customer 104 during the respective transaction, a time, place and date of the respective transaction, and so forth.

To recommend one or more items based on the transaction information 138, the catalog analysis module 132 can analyze the transaction information 138 using one or more algorithms that identify which of the identified items includes sales data that is greater than a threshold. In some instances, the threshold can correspond to a number of items acquired by customer(s) 104 from the one or more second merchant(s) 102 during respective transactions. For instance, the threshold can include ten items, fifty items, one hundred items, or the like. In some instances, the threshold can correspond to a number of items acquired by customer(s) 104 from the one or more second merchant(s) 102 during a respective time period. For instance, the threshold can include ten items per week, one hundred items per month, or the like. The catalog analysis module 132 can then determine to recommend one more of the identified items that exceed the threshold.

Additionally to, or alternatively from, using the threshold, the catalog analysis module 132 can utilize correlations between items in order to recommend one or more of the identified items. For instance, the catalog analysis module 132 can analyze the catalog 112 of the first merchant 102 in order to determine that the first merchant 102 offers a specific item for acquisition. Additionally, the catalog analysis module 132 can analyze the catalogs 112 of the one or more second merchants 102 to determine that at least some of the one or more second merchants 102 further offer the specific item for acquisition. The catalog analysis module 132 can then analyze the transaction data 138 to determine that customer(s) 104 that acquire the specific item from the one or more second merchant(s) 102 tend to also acquire an additional item, either during the same transaction and/or during a previous/subsequent transaction. Based on the determination, the catalog analysis module 132 can determine to recommend that the first merchant 102 offer the additional item for acquisition.

Even though the above describes examples of determining which items to recommend, the catalog analysis module 132 can perform similar techniques to determine which services to recommend to the first merchant 102. For instance, the catalog analysis module 132 can utilize one or more algorithms to identify one or more services that the one or more second merchant(s) 102 offer for acquisition. The catalog analysis module 132 can then determine which of the one or more identified services to recommend to the first merchant 102. In some instances, similar to the items above, when determining which services to recommend, the catalog analysis module 132 can recommend services using thresholds, transaction information 138, and correlations between services/items.

After determining the item(s)/services(s) to recommend to the first merchant 102, the payment service 108 can generate and send message(s) 152 to the first merchant 102 that recommend that the first merchant 102 offer the determined item(s)/services(s) for acquisition. A merchant device 116 associated with the first merchant 102 can receive the message(s) 152 from the payment service 108, provide (e.g., display) the recommendation to the first merchant 102, receive input indicating that the first merchant 102 wants to add the item(s)/services(s) to the catalog 112, and send a catalogue/inventory request 148 that indicates that the first merchant wants to add the item(s)/services(s) to the catalog 112. In response, the payment service 108 can receive the catalogue/inventory request 148, and then utilize the catalog management module 128 to store one or more indications of the item(s)/service(s) in association with the catalog 112. For instance, the catalog management module 128 can store a data item that represents an item, or store a data service that represents a service, in the catalog 112 of the first merchant 102.

In addition to recommending item(s)/service(s), the payment service 108 can recommend a quantity of the item(s) for merchant(s) 102 to acquire. For instance, after recommending an item to the first merchant 102, the inventory analysis module 134 can utilize one or more algorithms to analyze inventory(s) 146 of the one or more second merchant(s) 102 in order to determine the quantity for the item. In some instances, the quantity can include the lowest quantity a respective merchant 102 keeps available, a highest quantity a respective merchant 102 keeps available, an average quantity a respective merchant 102 keeps available, and average quantity that the one or more second merchants 102 keep available, a quantity that is between the lowest quantity and the highest quantity, or any other quantity.

In some instances, in addition to, or alternatively from, analyzing the inventory(s) 146, the inventory analysis model 134 can analyze the transaction information 138 to determine the quantity. For instance, the inventory analysis module 134 can utilize one or more algorithms that analyze the transaction information 138 to determine sales for the item at respective merchant(s) 102. The inventory analysis module 134 can then determine the quantity based on the sales. For instance, the inventory analysis module 134 can determine the quantity based on the lowest sales at a respective merchant 102, the highest sales at a respective merchant 102, average sales for the one or more second merchant(s) 102, and/or the like.

After determining the quantity to recommend to the first merchant 102, the payment service 108 can generate and send message(s) 152 to the first merchant 102 that recommend that the first merchant 102 acquire the quantity of the item. A merchant device 116 associated with the first merchant 102 can receive the message(s) 152 from the payment service 108, and provide (e.g., display) the recommendation to the first merchant 102. Additionally, after the first merchant 102 acquires the quantity of the item, the merchant device 116 can receive input indicating that the first merchant 102 acquired the quantity of the item and send a catalogue/inventory request 148 that indicates that the first merchant 102 acquired the quantity to the payment service 108. In response, the payment service 108 can receive the catalogue/inventory request 148, and then utilize the inventory management module 130 to store one or more indications of the quantity in association with the inventory 146 of the first merchant 102.

In some instances, the payment service 108 may integrate functionality across multiple application(s) 114 in order to provide merchant(s) 102 with application(s) 114 that are customized for each respective merchant 102. For instance, the payment service 108 may store multiple application(s) 114 that merchant(s) 102 can use to conduct transactions with customer(s) 104. In some instances, each application 114 may be associated with a type of business. For example, the payment service 108 may store a first application 114 that is associated with retail merchants (e.g., merchants that sell items, such as clothes, groceries, sporting equipment, etc.), a second application 114 that is associated with merchants that provide services (e.g., mechanics, doctor offices, cleaning services, etc.), and a third application 114 that is associated with restaurant merchants (e.g., restaurants, bars, etc.).

In some instances, each application 114 may include functionality based on the type of business that the respective application 114 is associated with. For instance, and using the example above with the three separate applications 114, the retail application 114 may include functionality that causes a merchant device 116 to provide a retail user interface. The retail user interface may include one or input options that a merchant 102 can utilize to input information describing one or more items that are being acquired by a customer 104 during a transaction. For instance, the retail user interface may include input options that the merchant 102 can use to input an identity of an item, a quantity for the item, physical properties of the item (e.g., size, color, etc.), or the like.

Additionally, the services application 114 can include functionality that causes a merchant device 116 to provide a services user interface. The services user interface may include one or input options that a merchant 102 can utilize to input information describing one or more services that are being acquired by a customer 104 during a transaction. For instance, the services user interface may include input options that the merchant 102 can use to input an identity of the service, an appointment time for the service, notes specific to how the service is to be performed, or the like.

Furthermore, the restaurant application 114 can include functionality that causes a merchant device 116 to provide a restaurant user interface. The restaurant user interface may include one or input options that a merchant 102 can utilize to input information describing one or more food menu items that are being acquired by a customer 104 during a transaction. For instance, the restaurant user interface may include input options that the merchant 102 can use to input an identity of a menu item, a quantity for the menu item, notes on how to prepare the menu item, sides to include with the menu item, or the like.

In some instances, however, merchant(s) 102 may be associated with more than one type of business. For instance, a merchant's 102 primary business purpose may be associated with providing services to customer(s) 104, such as by providing customer(s) 104 with golf lessons, but the merchant 102 may further offer items for sale to customer(s) 104, such as golf equipment. As such, the payment service 108 may generate application(s) 114 that are customized for merchant(s) 102 that are associated with more than one type of business and/or provide applications(s) 114 that are customized for merchant(s) 102 that are associated with more than one type of business.

For instance, the payment service 108 may generate application(s) 114 using one or more codebase(s) 154 that include the code from each of the applications that is associated with a respective type of business. For example, and using the example above, each of the retail application 114, services application 114, and restaurant application 114 may be built using respective code that provides the respective application 114 with the functionality described above. For instance, the retail application 114 may be built using first code that provides the retail application 114 with the functionality required by retail merchants to conduct transactions, the services application 114 may be built using second code that provides the services application 114 with the functionality required by merchants that provide services to conduct transactions, and the restaurant application 114 may be built using third code that provides the restaurant application 114 with the functionality required by restaurant merchants to conduct transactions.

The application module 136 can generate a codebase 154 using the code from each of the applications(s) 114, and then use the codebase 154 to generate customized application(s) 114. For example, and using the example above, the application module 136 can generate a customized retail application 114 that includes at least some of the first code from the retail application 114 and at least some of the second code from the services application 114. For another example, the applications module 136 can generate a customized retail application 114 that includes at least some of the first code from the retail application 114, at least some of the second code from the services application 114, and at least some of the third code from the restaurant application 114. The payment service 108 can perform similar processes for generating customized services application(s) 114 and/or customized restaurant application(s) 114 using the codebases(s) 154.

The customized application 114 can then include functionality from at least two of the applications(s) 114 that were associated with the various types of business. For instance, the customized retail application 114 can include functionality that causes a merchant device 116 operate in two or more modes of operation, where each mode of operation is associated with a type of business (e.g., functionality from one of the original three applications 114). For instance, and using the example above where the application module 136 generates a customized retail application 114 that includes at least some of the first code from the retail application 114, at least some of the second code from the services application 114, and at least some of the third code from the restaurant application 114, the merchant device 116 can execute the customized retail application 114 during a transaction between a merchant 102 and a customer 104.

During execution of the customized retail application 114, the merchant device 116 may initially operate in a first mode of operation (e.g., primary mode of operation) that is associated with retail since the customized application 114 is a "retail application." While operating in the first mode of operation, the merchant device 116 may provide a retail user interface that includes the one or input options for inputting information describing items that the customer 104 is acquiring from the merchant 102 during the transaction. The merchant device 116 may receive the inputted information via the retail user interface, and update the retail user interface to indicate each of the items being acquired by the customer 104 during the transaction. In some instances, after receiving the inputted information, the merchant device 116 may attempt to authorize the transaction for a cost of the items. However, in some instances, the customer 104 may further acquire services from the merchant 102 during the transaction.

For instance, the merchant device 116 may receive input associated with transitioning from the first mode of operation to a second mode of operation, which may be associated with services. In some instances, the input may include a selection of a graphical icon provided by the retail user interface. In some instance, the input may include the merchant 102 inputting information into the merchant device 116 that is associated with a service, such as by scanning a barcode and/or other identifier associated with a service. Based on receiving the input, the merchant device 116 may transition from operating in the first mode of operation to operating in the second mode of operation. While operating in the second mode of operation, the merchant device 116 may provide a services user interface that includes one or more input options for inputting information describing services that the customer 104 is acquiring from the merchant 102. The merchant device 116 may receive the inputted information via the services user interface, and then update the services user interface to indicate each of the services being acquired by the customer during the transaction.

In the example, the merchant device 116 can perform a similar process to transition from operating in the second mode of operation to operating in a third mode of operation, which may be associated with restaurants. While operating in the third mode of operation, the merchant device 116 may provide a restaurant user interface that includes one or more input options for inputting information describing restaurant menu items that the customer 104 is acquiring from the merchant 102. The merchant device 116 may receive the inputted information via the restaurant user interface, and then update the restaurant user interface to indicate each of the restaurant menu items being acquired by the customer 104 during the transaction.

The example above describes that a primary mode operation for the customized retail application 114 is associated with a retail type of business. In some instances, this is because the primary business purpose for the customized retail application 114 is for retailer merchant(s) 102. For instance, retailer merchant(s) 102, whose primary business purpose is the selling of retail items, may access the payment service 108 to download the customized retail application 114 since the application 114 is customized for retail merchant(s) 102, i.e., the primary mode of operation includes the functionality associated with the retail application 114 described above.

In some instances, the application module 136 may generate and/or provide customized applications 114 for other types of business (e.g., services, restaurants, etc.). For instance, the application module 136 may generate a customized services application 114 using the same codebase 154 as the customized retail application 114. However, the primary mode of operation for the customized services application 114 is for merchant(s) 102 that primarily offer services to customer(s) 104. For instance, when executing on a merchant device 116, the first mode of operation that the customized services application 114 operates in will include the mode of operation associated with the services application described above. For example, the merchant device 116 will provide a services user interface that includes the one or input options for inputting information describing services that a customer 104 is acquiring from a merchant 102 during a transaction.

In some instances, the merchant 102 may set the primary mode of operation for a customized application 114. For instance, the merchant 102 may use a merchant device 116 to download a customized application 114 that is built using a codebase 154 that includes code from multiple applications 114, where each application is associated with a respective type of business. While executing the customized application 114, the merchant device 116 may receive input from the merchant 102 that indicates that the primary business purpose for the merchant 102 is one of the respective types of businesses. For instance, the input may indicate that the merchant 102 is primarily a retail merchant. Based on the input, the merchant device 116 may cause the customized application 114 to set the primary mode of operation based on the primary business purpose. For instance, the merchant device 116 may cause the customized application 114 to set the primary mode of operation to be associated with a retail type of business.

As illustrated in FIG. 1, the merchant device(s) 116 send application request(s) 156 to the payment service 108. In some instances, the application request(s) 156 include messages requesting one or more of the application(s) for 114 for download to the merchant device(s) 116. For instance, a merchant 102 may utilize a merchant device 116 to access an online marketplace (and/or another type of online service) for the application(s) 114. The merchant 102 can then search through the online marketplace to identify at least one application 114 for download. After identifying the application 114, the merchant device 116 can send an application request 156 to the payment service 108 requesting the identified application 114.

The payment service 108 can receive the application request(s) 156 from the merchant device(s) 116 and send application(s) 158 in response. For instance, and using the example above, the payment service 108 can receive the application request 156 from the merchant device 116. Based on receive the application request 156, the payment service 108 can cause the application 158 to be send to the merchant device 116, where the application 158 corresponds to the application 114 requested by the merchant device 116.

Although above describes integrating functionality across multiple applications 114 that are associated with types of business that includes retail, services, and restaurants, the above techniques can be used to integrate functionality across applications 114 that are associated with other types of business. For instance, the payment service 108 may provide applications 114 that are associated with various MCCs. To customize applications(s) 114, the payment service 108 may create a codebase 154 using the code from each of the applications 114, and then generate customized applications(s) 114 using the codebase 154. By generating customized application(s) 114 using the codebase 154, the application(s) 114 will include functionality of two or more of the applications 114 that are associated with the various MCCs.

As discussed herein, processor(s), such as processor(s) 120, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 122, may be an example of tangible non-transitory computer storage media and may include volatile and non-volatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology.

Further, in some cases, devices, such as merchant device(s) 116, the payment service 108, a customer device, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

As discussed above, the memory 122 may include functional components, such as the operating system 124, for controlling and managing various functions of the payment service 108 and for enabling basic user interactions with the payment service 108.

FIG. 2 illustrates select example components of an example merchant device 200 according to some implementations. The merchant device 200 may include any of the merchant device(s) 116 from FIG. 1. The merchant device 200 may be any suitable type of computing device, e.g., mobile, semi-mobile, semi-stationary, or stationary. Some examples of the merchant device 200 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the merchant device 200 includes at least one processor 202, memory 204, a display 206, one or more input/output (I/O) components 208, one or more network interfaces 210, at least one card reader 212, at least one location component 214, and at least one power source 216. Each processor 202 may itself comprise one or more processors or processing cores. For example, the processor 202 can be implemented as one or more microprocessors, microcomputers, microcontrollers, digital signal processors, central processing units, state machines, logic circuitries, and/or any devices that manipulate signals based on operational instructions. In some cases, the processor 202 may be one or more hardware processors and/or logic circuits of any suitable type specifically programmed or configured to execute the algorithms and processes described herein. The processor 202 can be configured to fetch and execute computer-readable processor-executable instructions stored in the memory 204.

Depending on the configuration of the merchant device 200, the memory 204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 204 may include, but is not limited to, RAM, ROM, EEPROM, flash memory, solid-state storage, magnetic disk storage, optical storage, and/or other computer-readable media technology. Further, in some cases, the merchant device 200 may access external storage, such as RAID storage systems, storage arrays, network attached storage, storage area networks, cloud storage, or any other medium that can be used to store information and that can be accessed by the processor 202 directly or through another computing device or network. Accordingly, the memory 204 may be computer storage media able to store instructions, modules or components that may be executed by the processor 202. Further, when mentioned, non-transitory computer-readable media exclude media such as energy, carrier signals, electromagnetic waves, and signals per se.

The memory 204 may be used to store and maintain any number of functional components that are executable by the processor 202. In some implementations, these functional components comprise instructions or programs that are executable by the processor 202 and that, when executed, implement operational logic for performing the actions and services attributed above to the merchant device 200. Functional components of the merchant device 200 stored in the memory 204 may include an application 218, which may include one of application(s) 114 from FIG. 1.

As discussed above, the application 218 may cause the merchant device 200 to operate in various modes of operation, where each mode of operation is associated with a respective type of business. For each mode of operation, the application 218 can cause the merchant device 200 to present a user interface for inputting information describing item(s)/service(s) being acquired by customer(s) during a respective transaction. Additionally, each user interface may enable the merchant device 200 to receive payments from customers, as well as communicate with the payment service 108 for processing payments and sending transaction information. Further, in some instances, the application 218 may present a user interface to enable the merchant to manage the merchant's account, manage the merchant's catalog, manage the merchant's inventory, and the like. Finally, the application 218 may receive recommendations from the payment service 108, such as recommendations for item(s)/service(s) and/or recommendations for quantities of items.

Additional functional components may include an operating system 220 for controlling and managing various functions of the merchant device 200 and for enabling basic user interactions with the merchant device 200. The memory 204 may also store transaction data 222 that is received based on the merchant associated with the merchant device 200 engaging in various transactions with customers, such as the example customer 104 from FIGS. 1-4. Additionally, the memory 204 may store contact information for customer, such as the customer 104.

In addition, the memory 204 may also store data, data structures and the like, that are used by the functional components. For example, this data may include item information that includes information about the items offered by the merchant, which may include images of the items, descriptions of the items, prices of the items, and so forth. Depending on the type of the merchant device 200, the memory 204 may also optionally include other functional components and data, which may include programs, drivers, etc., and the data used or generated by the functional components. Further, the merchant device 200 may include many other logical, programmatic and physical components, of which those described are merely examples that are related to the discussion herein.

The network interface(s) 210 may include one or more interfaces and hardware components for enabling communication with various other devices over the network or directly. For example, network interface(s) 210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 2 further illustrates that the merchant device 200 may include the display 206 mentioned above. Depending on the type of computing device used as the merchant device 200, the display 206 may employ any suitable display technology. For example, the display 206 may be a liquid crystal display, a plasma display, a light emitting diode display, an OLED (organic light-emitting diode) display, an electronic paper display, or any other suitable type of display able to present digital content thereon. In some examples, the display 206 may have a touch sensor associated with the display 206 to provide a touchscreen display configured to receive touch inputs for enabling interaction with a graphic interface presented on the display 206. Accordingly, implementations herein are not limited to any particular display technology. Alternatively, in some examples, the merchant device 200 may not include the display 206, and information may be present by other means, such as aurally.

The I/O components 208, meanwhile, may include speakers, a microphone, a camera, and various user controls (e.g., buttons, a joystick, a keyboard, a keypad, etc.), a haptic output device, and so forth. For instance, I/O components 208 can include a printing device for printing physical receipts for customers. In some examples, the POS device uses the printing device to print the physical receipts after receiving data representing the receipts from a payment service.

It should be noted that, in some examples, the I/O components 208 may be separate from the merchant device 200. For instance, the printing device may be separate from the merchant device 200. In some examples, the merchant device 200 sends data representing the receipts to the printing device in order to cause the printing device to print physical receipts.

In addition, the merchant device 200 may include or may be connectable to a payment instrument reader 212. In some examples, the reader 212 may plug in to a port in the merchant device 200, such as a microphone/headphone port, a data port, or other suitable port. In other instances, the reader 212 is integral with the entire merchant device 200. The reader 212 may include a read head for reading a magnetic strip of a payment card, and further may include encryption technology for encrypting the information read from the magnetic strip. Alternatively, numerous other types of card readers may be employed with the merchant device 200 herein, depending on the type and configuration of a particular merchant device 200.

The location component 214 may include a GPS device able to indicate location information, or the location component 214 may comprise another other location-based sensor. The merchant device 200 may also include one or more additional sensors (not shown), such as an accelerometer, gyroscope, compass, proximity sensor, and the like. Additionally, the merchant device 200 may include various other components that are not shown, examples of which include removable storage, a power control unit, and so forth.

Figure 3:
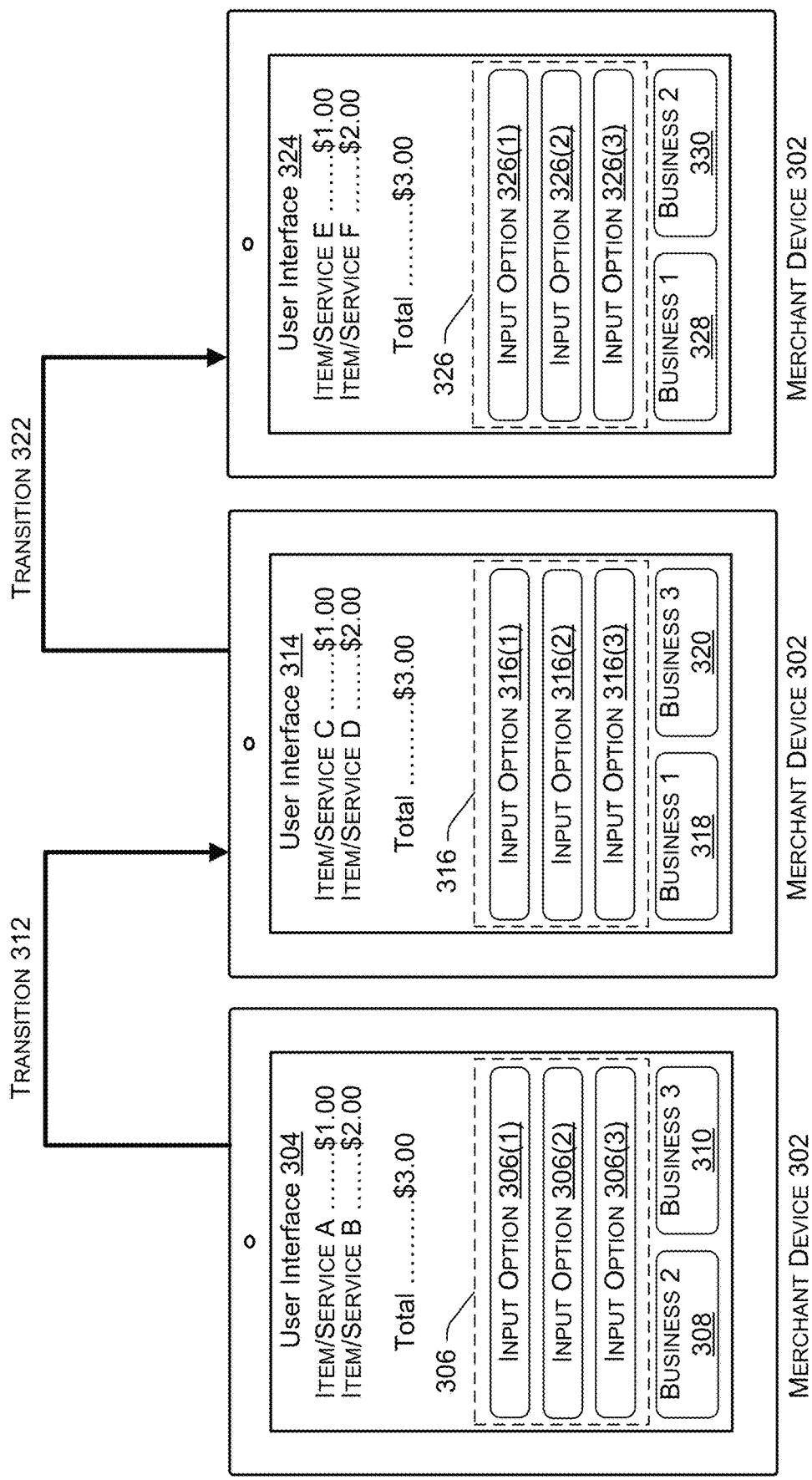
FIG. 3 illustrates an example of switching between different modes of operation during respective transactions.

FIG. 3 illustrates an example of switching between different modes of operation during respective transactions. For instance, the merchant device 302, which may include one of the merchant device(s) 116 from FIG. 1, may execute an application that causes the merchant device 302 to operate in a first mode of operation. While operating in the first mode of operation, the merchant device 302 provides a first user interface 304 associated with a first type of business. As shown, the first user interface 304 includes input options 306 for inputting information describing items/services being acquired by a first customer during a first transaction.

For example, if the first type of business is associated with retail merchants, and the first user interface 304 is a retail user interface, the input options 306 may include a first input option 306(1) for inputting information describing an item (e.g., a barcode, SKU number, an identity of the item, etc.), a second input option 306(2) for inputting information describing a quantity of the item being acquired by the first customer, and a third input option 306(3) for inputting information describing attributes associated with the item (e.g., size, color, style, etc.). The merchant device 302 may receive input from the merchant, and then update the first user interface 304 based on the input. For instance, as shown in FIG. 3, the first user interface 304 indicates that the first customer is acquiring item/service A and item/service B from the merchant during the first transaction.

After inputting each of the items/services for the first transaction, the merchant can use the merchant device 302 to authorize payment for the first transaction. For instance, the merchant can cause the merchant device 302 to send transaction information associated with the first transaction, along with payment information associated with a payment instrument of the first customer, to a payment service for authorization. In response, the merchant device 302 can receive a message indicating whether the payment instrument was authorized for a cost of the first transaction.

The first interface 304 further includes two input options for transitioning the merchant device 302 to different modes of operation. For instance, a first input option 308 may cause the merchant device 302 to transition to operating in a second mode of operation, which may be associated with a second type of business. Additionally, a second input option 310 may cause the merchant device 302 to transition to operating in a third mode of operation, which may be associated with a third type of business.

For instance, the merchant device 302 may receive input selecting the second input option 310. Based on receiving the input, the merchant device 302 may transition 312 to the second mode of operation. While operating in the second mode of operation, the merchant device 302 provides a second user interface 314 associated with the second type of business. As shown, the second user interface 314 includes input options 316 for inputting information describing items/services being acquired by a second customer during a second transaction. In some instances, one or more of the input options 316 differ from the input options 306.

For example, if the second type of business is associated with merchants that offer services to customers, and the second user interface 314 is a services user interface, the input options 316 may include a first input option 316(1) for inputting information describing a service (e.g., description of the service, type of service being acquired, etc.), a second input option 316(2) for inputting information describing a scheduled time for the service (e.g., at 10:00, between 10:00 and 11:00, etc.), and a third input option 316(3) for inputting information describing how the service is to be performed. The merchant device 302 may receive input from the merchant via the input options 316, and then update the second user interface 314 based on the input. For instance, as shown in FIG. 3, the second user interface 314 indicates that the second customer is acquiring item/service C and item/service D from the merchant during the second transaction.

After inputting each of the items/services for the second transaction, the merchant can use the merchant device 302 to authorize payment for the second transaction. For instance, the merchant can cause the merchant device 302 to send transaction information associated with the second transaction, along with payment information associated with a payment instrument of the second customer, to a payment service for authorization. In response, the merchant device 302 can receive a message indicating whether the payment instrument was authorized for a cost of the second transaction.

The second user interface 314 further includes two input options for transitioning the merchant device 302 to different modes of operation. For instance, a first input option 318 may cause the merchant device 302 to transition to operating in the first mode of operation, which may be associated with the first type of business. Additionally, a second input option 320 may cause the merchant device 302 to transition to operating in the third mode of operation, which may be associated with the third type of business.

For instance, the merchant device 302 may receive input selecting the second input option 320. Based on receiving the input, the merchant device 302 may transition 322 to the third mode of operation. While operating in the third mode of operation, the merchant device 302 provides a third user interface 324 associated with the third type of business. As shown, the third user interface 324 includes input options 326 for inputting information describing items/services being acquired by a third customer during a third transaction. In some instances, one or more of the input options 326 differ from one or more of the input options 306 and/or one or more of the input options 316.

For example, if the third type of business is associated with restaurants, and the third user interface 324 is a restaurant user interface, the input options 326 may include a first input option 326(1) for inputting information describing a menu item (e.g., an identity of the menu item, a code/number associated with the menu item, etc.), a second input option 326(2) for inputting any sides to include with the menu item (e.g., side of fries, a salad, etc.), and a third input option 326(3) for inputting information describing how the menu item is to be prepared (e.g., medium, extra ketchup, etc.). The merchant device 302 may receive input from the merchant via the input options 326, and then update the third user interface 324 based on the input. For instance, as shown in FIG. 3, the third user interface 324 indicates that the third customer is acquiring item/service E and item/service F from the merchant during the third transaction.

After inputting each of the items/services for the third transaction, the merchant can use the merchant device 302 to authorize payment for the third transaction. For instance, the merchant can cause the merchant device 302 to send transaction information associated with the third transaction, along with payment information associated with a payment instrument of the third customer, to a payment service for authorization. In response, the merchant device 302 can receive a message indicating whether the payment instrument was authorized for a cost of the third transaction.

The third user interface 324 further includes two input options for transitioning the merchant device 302 to different modes of operation. For instance, a first input option 328 may cause the merchant device 302 to transition to operating in the first mode of operation, which may be associated with the first type of business. Additionally, a second input option 330 may cause the merchant device 302 to transition to operating in the second mode of operation, which may be associated with the second type of business.

Figure 4:
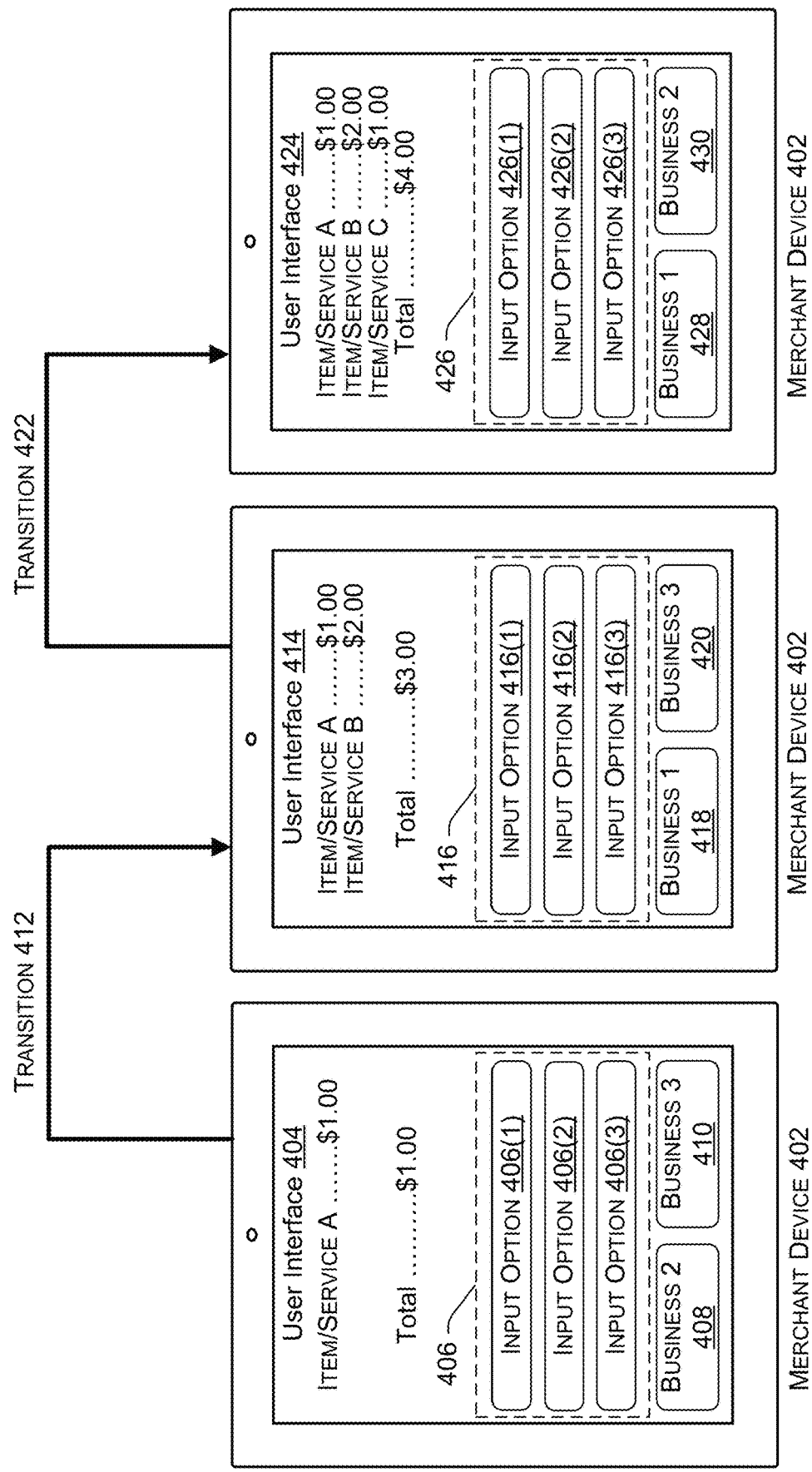
FIG. 4 illustrates an example of switching between different modes of operation during a single transaction.

FIG. 4 illustrates an example of switching between different modes of operation during a single transaction. For instance, the merchant device 402, which may include one of the merchant device(s) 116 from FIG. 1, may execute an application that causes the merchant device 402 to operate in a first mode of operation. While operating in the first mode of operation, the merchant device 402 provides a first user interface 404 associated with a first type of business. As shown, the first user interface 404 includes input options 406 for inputting information describing items/services being acquired by a customer during a transaction.

For example, if the first type of business is associated with retail merchants, and the first user interface 404 is a retail user interface, the input options 406 may include a first input option 406(1) for inputting information describing an item (e.g., a barcode, SKU number, an identity of the item, etc.), a second input option 406(2) for inputting information describing a quantity of the item being acquired by the customer, and a third input option 406(3) for inputting information describing attributes associated with the item (e.g., size, color, style, etc.). The merchant device 402 may receive input from the merchant, and then update the first user interface 404 based on the input. For instance, as shown in FIG. 4, the first user interface 404 indicates that the customer is acquiring item/service A during the transaction.

The first user interface 404 further includes two input options for transitioning the merchant device 402 to different modes of operation. For instance, a first input option 408 may cause the merchant device 402 to transition to operating a second mode of operation, which may be associated with a second type of business. Additionally, a second input option 410 may cause the merchant device 402 to transition to operating in a third mode of operation, which may be associated with a third type of business.

For instance, the merchant device 402 may receive input selecting the second input option 410. Based on receiving the input, the merchant device 402 may transition 412 to the second mode of operation. While operating in the second mode of operation, the merchant device 402 provides a second user interface 414 associated with the second type of business. As shown, the second user interface 414 includes input options 416 for inputting information describing items/services being acquired by the customer during the transaction. In some instances, one or more of the input options 416 differ from the input options 406.

For example, if the second type of business is associated with merchants that offer services to customers, and the second user interface 414 is a services user interface, the input options 416 may include a first input option 416(1) for inputting information describing a service (e.g., description of the service, type of service being acquired, etc.), a second input option 416(2) for inputting information describing a scheduled time for the service (e.g., at 10:00, between 10:00 and 11:00, etc.), and a third input option 416(3) for inputting information describing how the service is to be performed. The merchant device 402 may receive input from the merchant via the input options 416, and then update the second user interface 414 based on the input. For instance, as shown in FIG. 4, the second user interface 414 indicates that the customer is now acquiring item/service A and item/service B from the merchant during the transaction.

The second user interface 414 further includes two input options for transitioning the merchant device 402 to different modes of operation. For instance, a first input option 418 may cause the merchant device 402 to transition to operating in the first mode of operation, which may be associated with the first type of business. Additionally, a second input option 420 may cause the merchant device 402 to transition to operating in the third mode of operation, which may be associated with the third type of business.

For instance, the merchant device 402 may receive input selecting the second input option 420. Based on receiving the input, the merchant device 402 may transition 422 to the third mode of operation. While operating in the third mode of operation, the merchant device 402 provides a third user interface 424 associated with the third type of business. As shown, the third user interface 424 includes input options 426 for inputting information describing items/services being acquired by the customer during the transaction. In some instances, one or more of the input options 426 differ from one or more of the input options 406 and/or one or more of the input options 416.

For example, if the third type of business is associated with restaurants, and the third user interface 424 is a restaurant user interface, the input options 426 may include a first input option 426(1) for inputting information describing a menu item (e.g., an identity of the menu item, a code/number associated with the menu item, etc.), a second input option 426(2) for inputting any sides to include with the menu item (e.g., side of fries, a salad, etc.), and a third input option 426(3) for inputting information describing how the menu item is to be prepared (e.g., medium, extra ketchup, etc.). The merchant device 402 may receive input from the merchant via the input options 426, and then update the third user interface 424 based on the input. For instance, as shown in FIG. 4, the third user interface 424 indicates that the customer is now acquiring item/service A, item/service B, and item/service C from the merchant during the transaction.

After inputting each of the items/services for the transaction, the merchant can use the merchant device 402 to authorize payment for the third transaction. For instance, the merchant can cause the merchant device 402 to send transaction information associated with the transaction, along with payment information associated with a payment instrument of the customer, to a payment service for authorization. In response, the merchant device 402 can receive a message indicating whether the payment instrument was authorized for a cost of the transaction.

The third user interface 424 further includes two input options for transitioning the merchant device 402 to different modes of operation. For instance, a first input option 428 may cause the merchant device 302 to transition to operating in the first mode of operation, which may be associated with the first type of business. Additionally, a second input option 430 may cause the merchant device 402 to transition to operating in the second mode of operation, which may be associated with the second type of business.

FIG. 5 illustrates an example of customizing user interfaces for respective merchants. For instance, the payment service may generate customized applications for merchants based on transaction information associated with the respective merchants. In some instances, customizing an application may include causing the one or more user interfaces associated with the application to provide content based on the transaction information. For instance, as illustrated in FIG. 5, each of the merchant device 502 and the merchant device 504 (which may each represent one of merchant device(s) 116) are displaying content that is customized for a respective merchant.

For instance, merchant device 502 may be executing an application that causes the merchant device 502 to provide a user interface 506. In some instances, the user interface 506 may be similar to one or more of the user interfaces 304, 314, 324 of FIG. 3, and/or one or more of the user interfaces 404, 414, 424 of FIG. 4. However, the user interface 506 may include an item selection element 508 that allows a first merchant to quickly select Items A-D for input. For instance, each of "Item A", "Item B", "Item C", and "Item D" may include an input option that, when selected by the first merchant, adds the respective Item A-D to a transaction between the first merchant and a customer.

Additionally, merchant device 504 may be executing an application that causes the merchant device 504 to provide a user interface 510. In some instances, the user interface 510 may be similar to the user interface 510, and also include an item selection element 512. However, the item selection element 512 of user interface 510 allows a second merchant to quickly select Items E-H for input. For instance, each of "Item E", "Item F", "Item G", and "Item H" may include an input option that, when selected by the second merchant, adds the respective Item E-H to a transaction between the second merchant and a customer.

In some instances, the payment service generates the applications and/or updates the applications based on transaction information associated with the first merchant and the second merchant, respectively. For instance, the payment service may determine that, based on the transaction information for the first merchant, customers acquire a greater number of Items A-D from the first merchant than any other item. As such, the payment service may generate the application for the first merchant, and/or update the application for the first merchant after the merchant device 502 downloads the application, such that user interface 506 includes the item selection element 508 that allows a first merchant to quickly select Items A-D during a transaction.

Additionally, the payment service may determine that, based on the transaction information for the second merchant, customers acquire a greater number of Items E-H from the second merchant than any other item. As such, the payment service may generate the application for the second merchant, and/or update the application for the second merchant after the merchant device 504 downloads the application, such that user interface 510 includes the item selection element 512 that allows a second merchant to quickly select Items E-H during a transaction.

Figure 6:
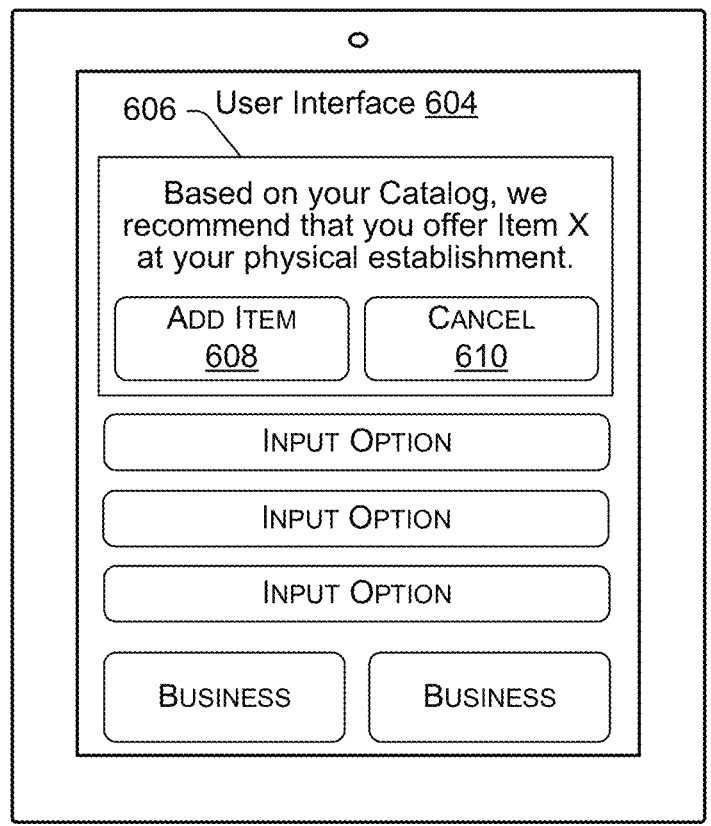
FIG. 6 illustrates an example of providing a catalog recommendation to a merchant.

FIG. 6 illustrates an example of providing a catalog recommendation to a merchant. For instance, as discussed above, a payment service may analyze catalogs associated with merchants in order to determine at least one item that a particular merchant should offer for acquisition, at a physical establishment of the merchant and/or on an online marketplace of the merchant. The payment service can then generate a message for the merchant that recommends the item, and send the message to a merchant device associated with the merchant.

For instance, as illustrated in FIG. 6, a merchant device 602 associated with a merchant may be providing a user interface 604 that the merchant utilizes to conduct transactions with customers. In some instances, the user interface 604 may be similar to one or more of the user interfaces 304, 314, 324 of FIG. 3, and/or be similar to one or more of the user interfaces 404, 414, 424 of FIG. 4. While providing the user interface 604, the merchant device 602 may receive, from the payment service, a message that recommends that the merchant offer Item X for acquisition at the physical establishment of the merchant. In response, the merchant device 602 can provide the recommendation 606 via the user interface 604.

As shown, the recommendation 606 indicates that, based on the catalog associated with the merchant, the merchant offer Item X for acquisition at the physical establishment of the merchant. The recommendation 606 further includes a first input option 608 for adding Item X to the catalog and a second input option 610 for not adding Item X to the catalog. Based on the merchant selecting the first input option 608, the merchant device 602 may send the payment service a message requesting that Item X be added to the catalog. However, based on the merchant selecting the second input option 610, the merchant device 602 may send the payment service a message indicating that the merchant does not want to add Item X to the catalog.

Figure 7:
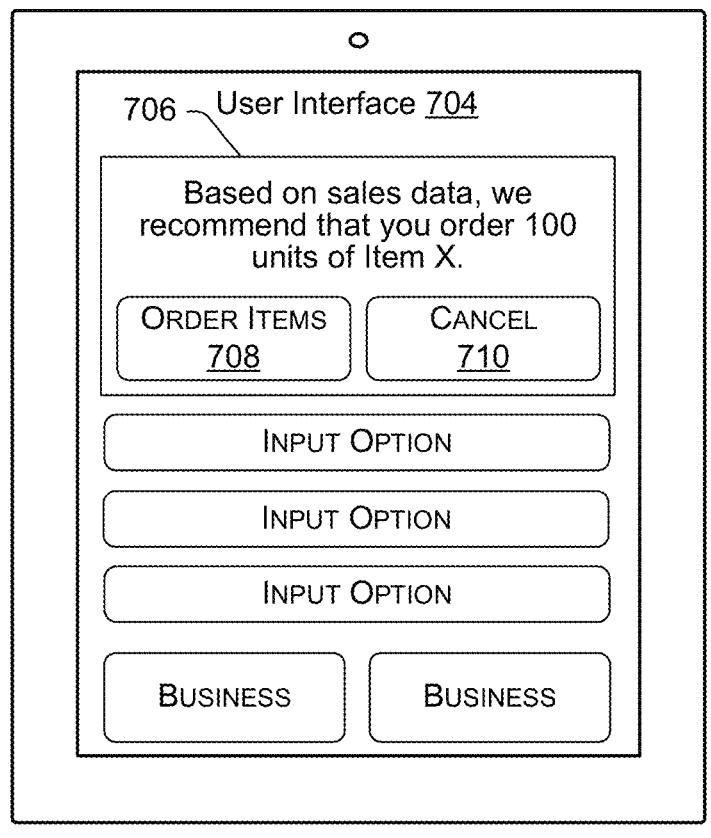
FIG. 7 illustrates an example of providing an inventory recommendation to a merchant.

FIG. 7 illustrates an example of providing an inventory recommendation to a merchant. For instance, as discussed above, a payment service may analyze inventories and/or transaction information associated with merchants in order to determine a quantity of at least one item that a particular merchant should keep available for customers. The payment service can then generate a message for the merchant that recommends the quantity, and send the message to a merchant device associated with the merchant.

For instance, as illustrated in FIG. 7, a merchant device 702 associated with a merchant may be providing a user interface 704 that the merchant utilizes to conduct transactions with customers. In some instances, the user interface 704 may be similar to one or more of the user interfaces 304, 314, 324 of FIG. 3, and/or be similar to one or more of the user interfaces 404, 414, 424 of FIG. 4. While providing the user interface 704, the merchant device 702 may receive, from the payment service, a message that recommends that the merchant order one hundred units of Item X. In response, the merchant device 702 can provide a recommendation 706 via the user interface 704.

As shown, the recommendation 706 indicates that, based on sales data (e.g., transaction information associated with the merchant and/or other merchants), the merchant order one hundred units of Item X. The recommendation 706 further includes a first input option 708 for ordering one hundred units of Item X, and a second input option 710 for not ordering the one hundred units of Item X. Based on the merchant selecting the first input option 708, the merchant device 702 may send the payment service and/or another third-party service a message that orders one hundred units of Item X. Additionally, based on the merchant selecting the second input option 710, the merchant device 602 may send the payment service a message that indicates that the merchant does not want to order the one hundred units of Item X.

Figure 8A:
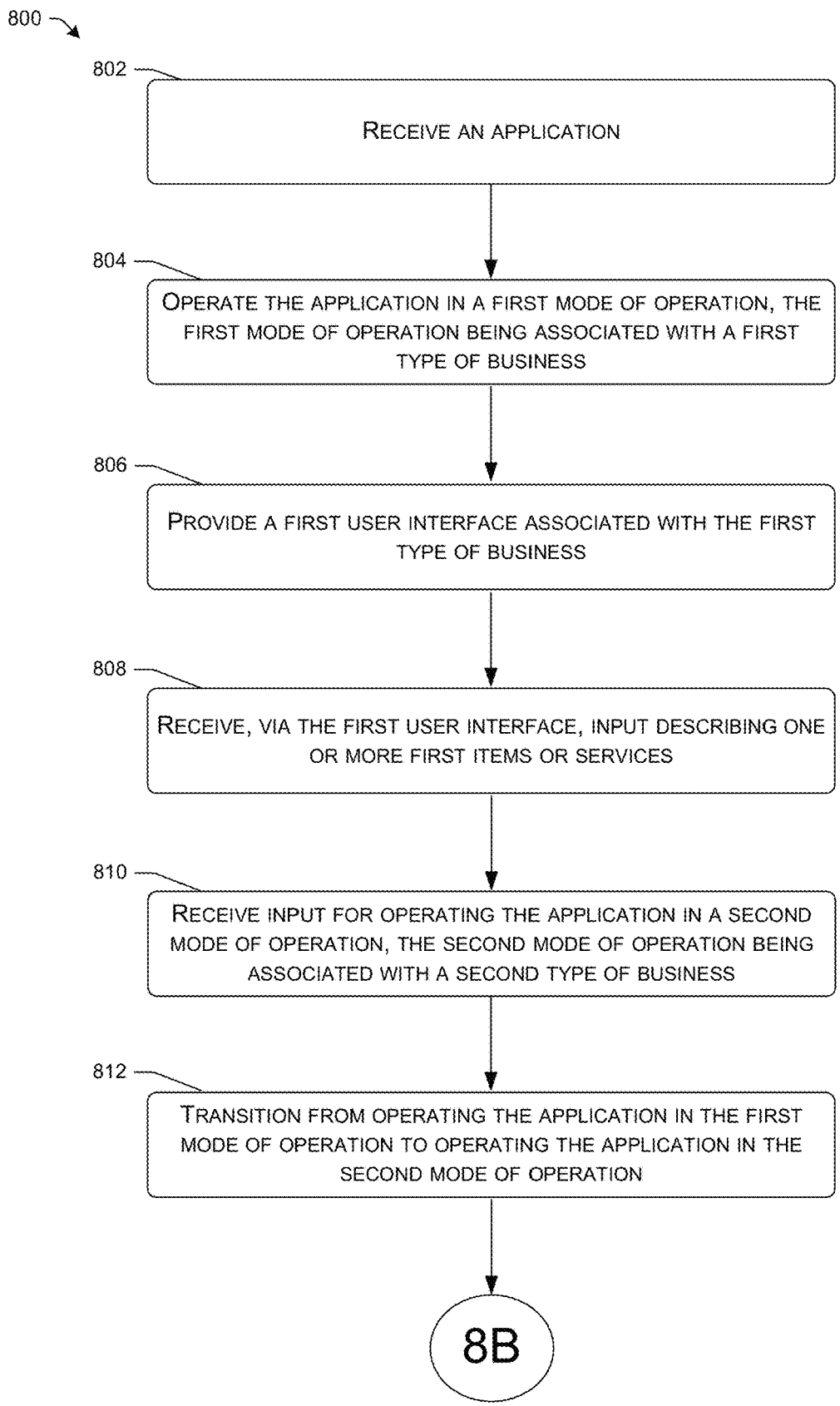
FIGS. 8A-8B illustrate a flow diagram of an example process for integrating functionality across multiple applications.
Figure 8B:
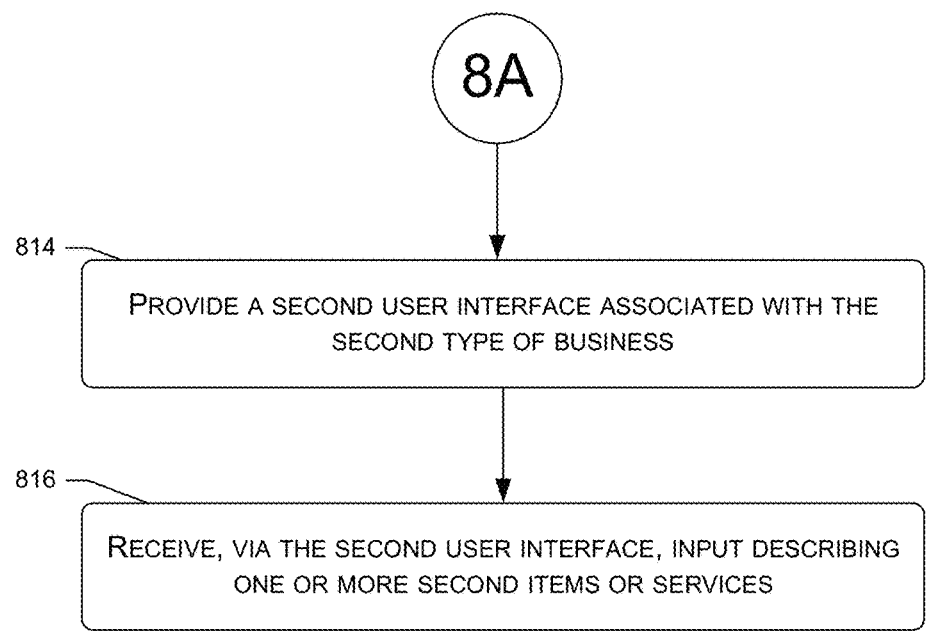

FIGS. 8A-8B illustrates a flow diagram of an example process 800 for integrating functionality across multiple applications. The process 800, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 800, and other processes described herein, may be performed by a payment service, a merchant device, a customer device, an additional electronic device, or by a combination thereof.

At 802, a merchant device 116 receives an application. For instance, the merchant device 116 may access a website and/or other online resource provided by a third-party service (e.g., the payment service 108). The website and/or other online resource may include various applications for download by the merchant device 116. For instance, the web site and/or other online resource may include multiple merchant applications, where each merchant application is associated with a respective type of business. For example, a first application may be associated with retail merchants, a second application may be associated with merchants that provide services, and a third merchant application may be associated with restaurants. In some instances, each of the applications may be generated using a similar codebase.

The merchant device 116 can receive input selecting an application from the multiple applications. For instance, the merchant can use the merchant device 116 to select the application that is associated with a primary business purpose of the merchant (e.g., retail, services, restaurant, etc.). Based on the input, the merchant device 116 can send the third-party service a request for the application. In response, the third-party service may send the application to the merchant device 116.

At 804, the merchant device 116 operates the application in a first mode of operation, the first mode of operation being associated with a first type of business. For instance, the merchant device 116 can execute the application. When the merchant device 116 first executes the application, the application operates in a first mode of operation (e.g., primary mode of operation) that is associated with the type of business that is specific to the application. For example, if the application is a retail application, the first mode of operation may be associated with retail merchants. For a second example, if the application is a services application, the first mode of operation may be associated with merchants that provide services. For a third example, if the application is a restaurant application, the first mode of operation may be associated with restaurant merchants.

At 806, the merchant device 116 provides a first user interface associated with the first type of business. For instance, based on operating in the first mode of operation, the merchant device 116 may display a user interface that is associated with the first type of business. For instance, the user interface may include one or more input options that are associated with items and/or services provided by the merchant, which are associated with the first type of business. For example, the one or more input options may be associated with retail items, services, or restaurant items based on the first type of business.

At 808, the merchant device 116 receives, via the first user interface, input describing one or more first items or services. For instance, the merchant may utilize the one or more input options to input information describing one or more first items or services being acquired by a customer during a transaction. The one or more first items or services may be associated with the first type of business. For instance, the one or more first items or services may be associated with a primary business purpose of the merchant. For example, if the merchant is primarily a retail merchant, the one or more first items or services can include retail items. For a second example, if the merchant primarily provides services to customers, the one or more first items or services can include services. For a third example, if the merchant is primarily a restaurant, the one or more first items or services may include menu items.

At 810, the merchant device 116 receives input for operating the application in a second mode of operation, the second mode of operation being associated with a second type of business. For instance, the merchant device 116 can receive input to transition from operating in the first mode of operation to the second mode of operation. In some instances, the input can include a selection of an input option being presented by the first user interface that is associated with the second mode of operation. In some instances, the input can include an identifier associated with an item or service. For instance, the merchant may scan a barcode of an item, which causes the merchant device 116 to receive the input.

In some instances, the merchant device 116 may receive the input during a single transaction between the merchant and a customer. For instance, the customer may be acquiring item(s) and/or service(s) from the merchant that are associated with both the first type of business and the second type of business. In some instances, the merchant device 116 may receive the input based on a second customer acquiring item(s) and/or service(s) from the merchant during a second transaction. For instance, after receiving the input describing the one or more first items or services, the merchant device 116 may attempt to authorize a payment instrument of the customer for a cost of the one or more first items or services. After authorizing the payment instrument, the merchant device 116 may receive the input for operating in the second mode of operation based on item(s) and/or service(s) being acquired by a second customer during a subsequent transaction.

At 812, the merchant device 116 transitions from operating the application in the first mode of operation to operating the application in the second mode of operation. For instance, based on the input, the merchant device 116 may transition to operating the application in the second mode of operation. As discussed above, the second mode of operation is associated with a second type of business. As such, the merchant device 116 may transition from operating in a mode of operation that is associated with a primary business purpose of the merchant (e.g., retail, services, restaurant, etc.) to operating in a mode of operation that is associated with a secondary business purpose of the merchant (e.g., retail, services, restaurant, etc.).

At 814, the merchant device 116 provides a second user interface associated with the second type of business. For instance, based on operating in the second mode of operation, the merchant device 116 may display a user interface that is associated with the second type of business. The user interface may include one or more input options that are associated with items and/or services provided by the merchant, which are associated with the second type of business. For example, the one or more input options may be associated with retail items, services, or restaurant items based on the second type of business.

At 816, the merchant device 116 receives, via the second user interface, input describing one or more second items or services. For instance, the merchant may utilize the one or more input options to input information describing one or more second items or services being acquired by a customer during a transaction. The one or more second items or services may be associated with the second type of business. For instance, the one or more second items or services may be associated with a secondary business purpose of the merchant. For example, if the merchant' secondary business purpose includes retail, the one or more second items or services can include retail items. For a second example, if the merchant's secondary business purpose includes providing services, the one or more second items or services can include services. For a third example, if the merchant's secondary business purpose includes a restaurant, the one or more second items or services may include menu items.

In some instances, the merchant device 116 can then attempt to authorize a transaction between the merchant and a customer. For instance, if each of steps 808-816 is associated with a single transaction between the merchant and a customer, the merchant device 116 can attempt to authorize a payment instrument for a cost of the one or more first items or services and the one or more second items or services. However, if steps 810-816 are associated with a second transaction between the merchant and a customer, the merchant device 116 can attempt to authorize a payment instrument for a cost of the one or more second items or services.

In some instance, the process 800 can continually repeat starting at step 810. For instance, the merchant device 116 may receive input to operate in a new mode of operation. The new mode of operation can include the first mode of operation, the second mode of operation, a third mode of operation, or the like. In some instances, each time the merchant device 116 receives input to operate in a new mode of operation, the merchant device 116 transitions to operating to the new mode of operation, where the new mode of operation is associated with a specific type of business. Additionally, the merchant device 116 provides a user interface that is associated with the specific type of business.

Although the examples for above for process 800 are described with types of business that include retail, services, and restaurant, the above process 800 can be utilized for other types of business. For example, the above process 800 can be utilized for types of business that are associated with various MCCs. For another example, the above process 800 can be utilized for types of business that are more specific to merchants. For instance, a type of business can include retailer merchants that provide sporting equipment, or restaurants that provide barbeque food items.

Figure 9A:
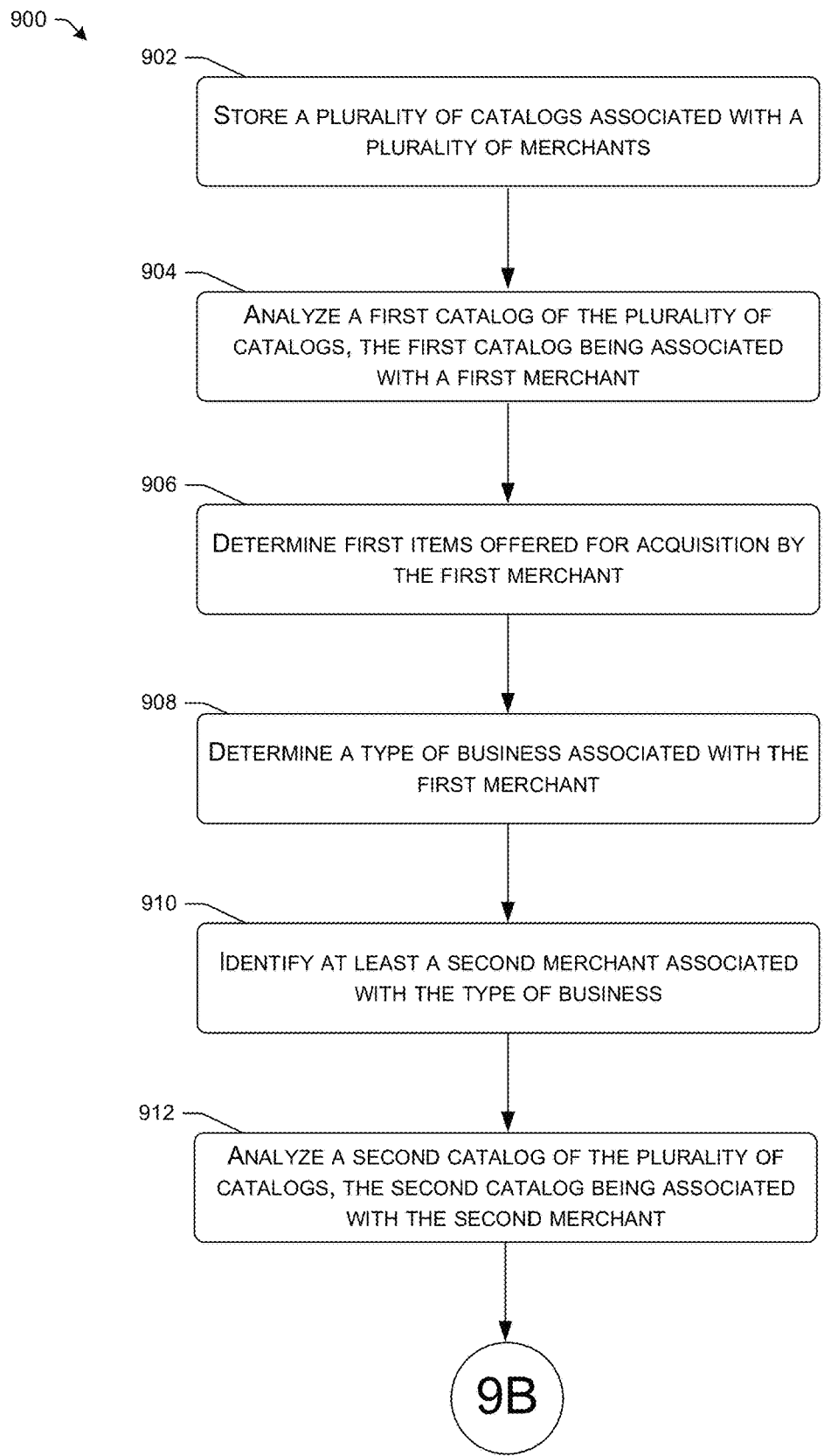
FIGS. 9A-9B illustrate a flow diagram of an example process for analyzing and updating a merchant's catalog.
Figure 9B:
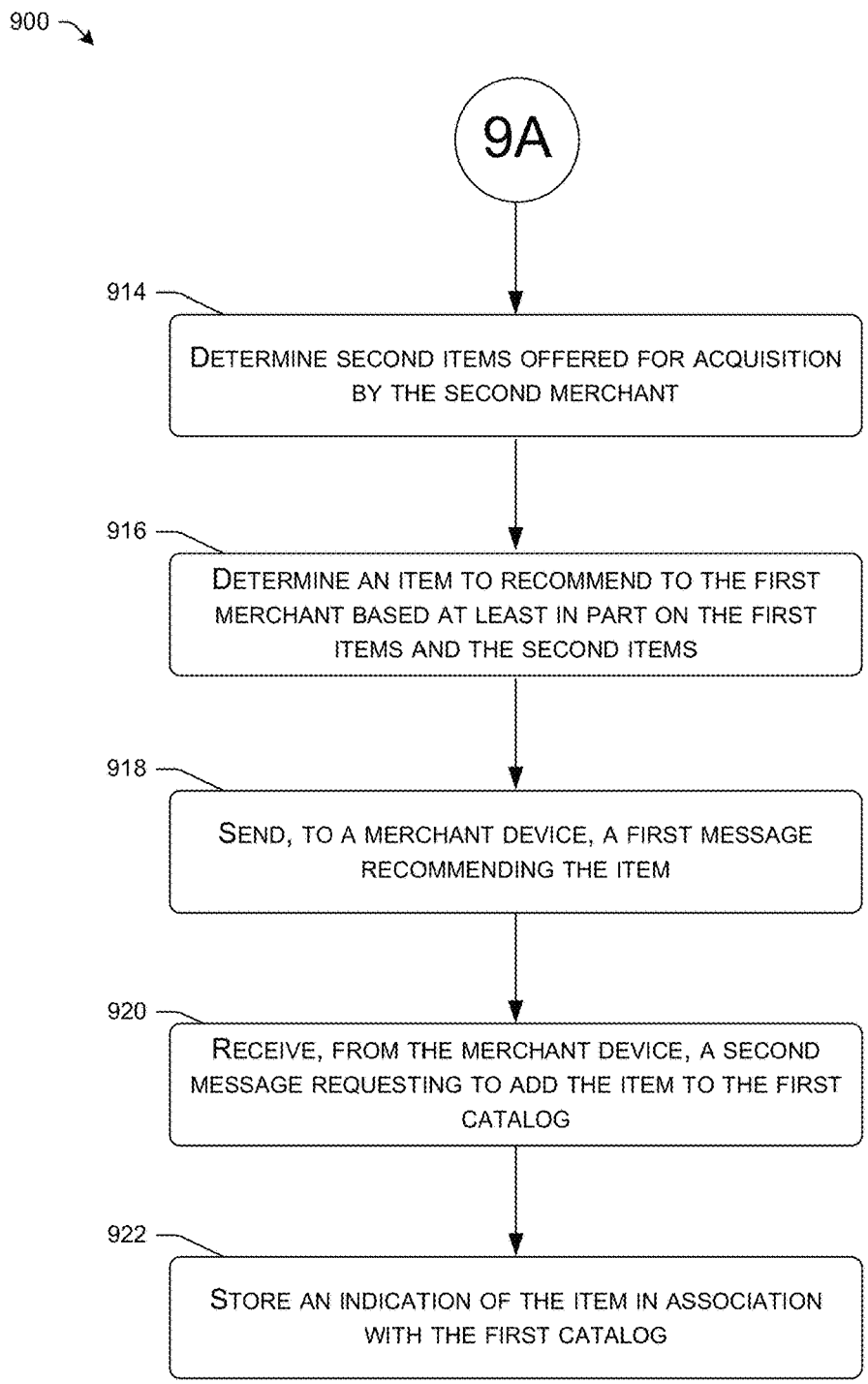

FIGS. 9A-9B illustrates a flow diagram of an example process 900 for analyzing and updating a merchant's catalog. At 902, a payment service 108 stores a plurality of catalogs associated with a plurality of merchants. For instance, the payment service 108 may provide tools for maintaining a catalog (i.e., catalog services) and/or an inventory (i.e., inventory services). A tool for maintaining a catalog may enable a merchant to access and manage a database storing data associated with items that the merchant has available for acquisition (i.e., a catalog). In at least one example, the catalog may include a plurality of data items and a data item of the plurality of data items may represent an item that the merchant has available for acquisition.

At 904, the payment service 108 analyzes a first catalog of the plurality of catalogs, the first catalog being associated with a first merchant, and at 906, the payment service 108 determines first items offered for acquisition by the first merchant. For instance, the payment service 108 may utilize one or more algorithms that analyze the first catalog in order to determine which items the first merchant offers for acquisition. To determine the items, the one or more algorithms can identity each of the data items included in the first catalog. In some instances, the one or more algorithms determine which items the first merchant offers for acquisition at a physical establishment of the first merchant, an online marketplace of the first merchant, or both.

At 908, the payment service 108 determines a type of business associated with the first merchant. In some instances, the payment service 108 can determine the type of business based on receiving input, from a merchant device of the first merchant, that indicates the type of business. In some instance, the payment service 108 can determine the type of business based on data that is stored in association with a profile of the first merchant, where the data indicates the type of business. Still, in some instances, the payment service 108 can determine the type of business based on the analysis of the first catalog. For instance, the payment service 108 can determine the type of business based on the first items that the first merchant provides for acquisition.

At 910, the payment service 108 identifies at least a second merchant associated with the type of business. In some instances, the payment service 108 identifies the second merchant based on analyzing profiles associated with the plurality of merchants to determine which of the plurality of merchants is also associated with the type of business. In some instances, the payment service 108 identifies the second merchant based on analyzing the catalogs of the plurality of other merchants to determine which merchants provide similar items for acquisition as the first merchant.

At 912, the payment service 108 analyzes a second catalog of the plurality of catalogs, the second catalog being associated with the second merchant, and at 914, the payment service 108 determines second items offered for acquisition by the second merchant. For instance, the payment service 108 may utilize the one or more algorithms to analyze the second catalog in order to determine which items the second merchant offers for acquisition. To determine the items, the one or more algorithms can identity each of the data items included in the second catalog. In some instances, the one or more algorithms determine which items the second merchant offers for acquisition at a physical establishment of the second merchant, an online marketplace of the second merchant, or both.

At 916, the payment service 108 determines an item to recommend to the first merchant based at least in part on the first items and the second items. For instance, the payment service 108 can utilize one or more algorithms that analyze the first items and the second items to identify at least one item that the second merchant offers for acquisition, but the first merchant does not offer for acquisition. The payment service 108 can then determine to recommend the item to the first merchant. In some instance, before determining to recommend the item to the first merchant, the payment service 108 may first analyze transaction information associated with the item to determine whether sales for the item exceed a threshold. The payment service 108 may then determine to recommend the item based on the sales exceeding the threshold.

At 918, the payment service 108 sends, to a merchant device, a first message recommending the item. For instance, the payment service 108 may generate a message that includes a recommendation for the item. The payment service 108 can then send the message to a merchant device associated with the merchant.

At 920, the payment service 108 receives, from the merchant device, a second message requesting to add the item to the first catalog. For instance, the merchant device may receive the first message from the payment service 108 and, in response, display the recommendation for the merchant. The merchant device can then receive input indicating that the merchant wants the item add to the first catalog. Based on the input, the merchant device can send the second message to the payment service 108.

At 922, the payment service 108 stores an indication of the item in association with the first catalog. For instance, the payment service 108 can receive the second message from the merchant device. Based on receiving the second message, the payment service 108 can store an indication of the item in association with the first catalog. For instance, the payment service 108 can store data item representing the item in the first catalog.

Figure 10:
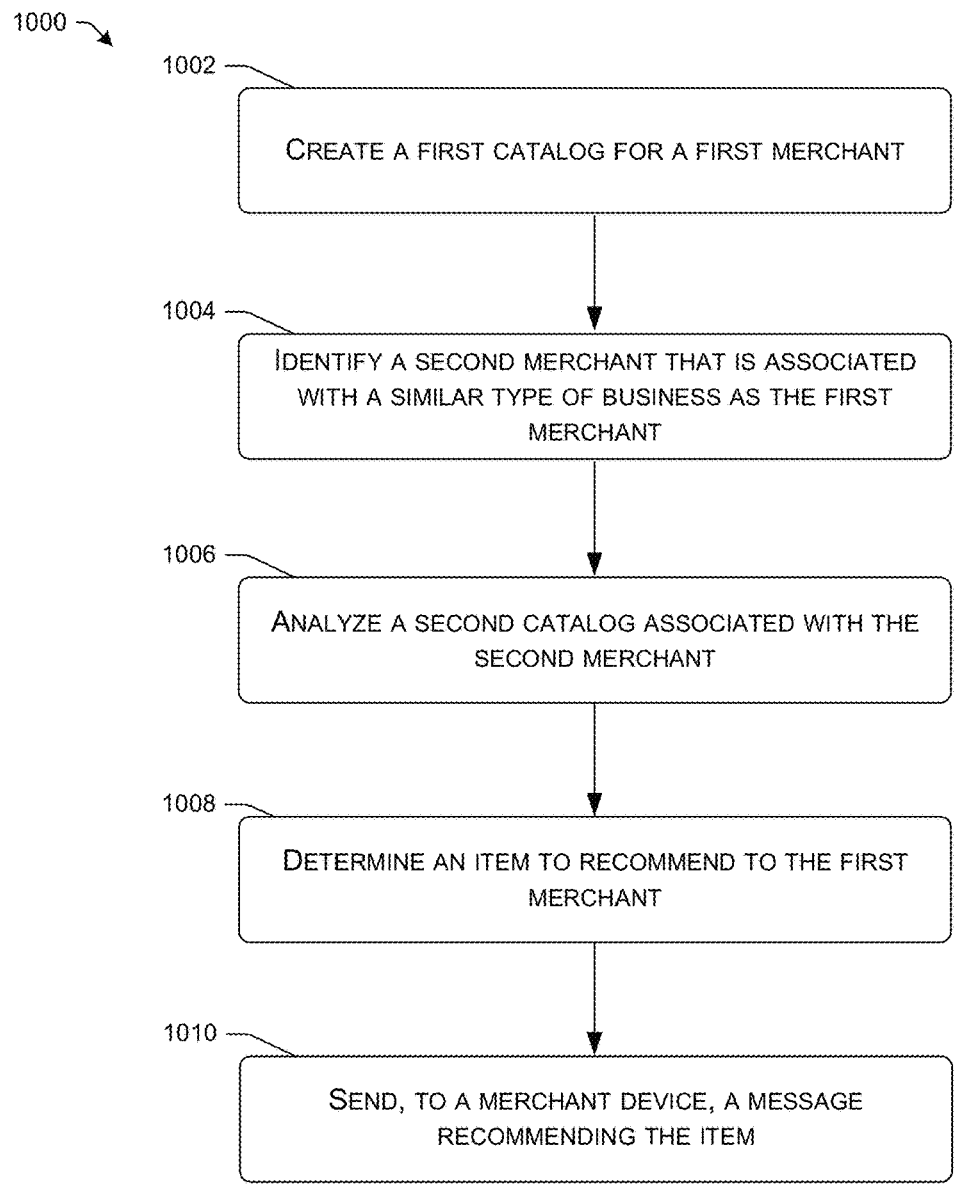
FIG. 10 illustrates a flow diagram of an example process for creating and updating a merchant's catalog.

FIG. 10 illustrates a flow diagram of an example process 1000 for creating and updating a merchant's catalog. At 1002, a payment service 108 creates a first catalog for a first merchant. For instance, the payment service 108 may receive a message from a merchant device associated with the first merchant, where the message requests that the payment service 108 create the first catalog. In response, the payment service 108 can create the first catalog for the first merchant and then store the first catalog in a database.

At 1004, the payment service 108 identifies a second merchant that is associated with a similar type of business as the first merchant. In some instances, the payment service 108 identifies the second merchant based on analyzing profiles associated with a plurality of merchants to determine which of the plurality of merchants is also associated with a similar type of business as the first merchant. In some instances, the payment service 108 identifies the second merchant based on analyzing the catalogs of the plurality of other merchants to determine which merchants provide similar items for acquisition as the first merchant.

At 1006, the payment service 108 analyzes a second catalog associated with the second merchant and at 1008, the payment service 108 determines an item to recommend to the merchant. For instance, the payment service 108 may utilize one or more algorithms to analyze the second catalog in order to identify which items the second merchant offers for acquisition, either at a physical establishment of the second merchant, an online marketplace of the second merchant, or both. To identify the items, the one or more algorithms can identity each of the data items included in the second catalog. The payment service 108 can then determine an item from the identified items to recommend to the first merchant.

At 1010, the payment service 108 sends, to a merchant device, a message recommending item. For instance, the payment service 108 may send the message to a merchant device associated with the first merchant. The merchant device may receive the message from the payment service 108 and, in response, display the recommendation to the first merchant. In some instances, the payment service 108 may then receive, from the merchant device, a message indicating that the first merchant wants to add the item to the first catalog. In response, the payment service 108 can store data representing the item in the first catalog.

Figure 11:
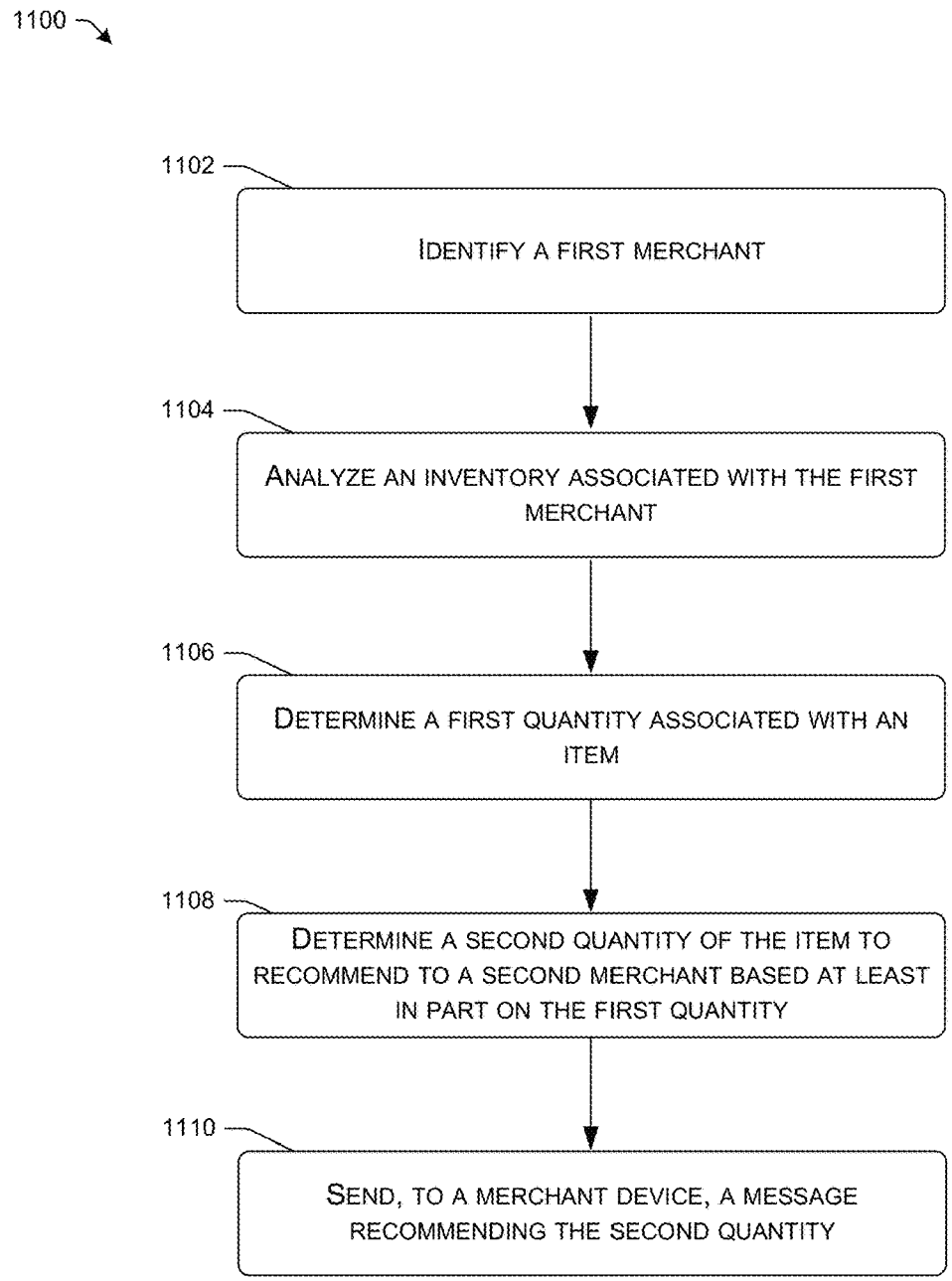
FIG. 11 illustrates a flow diagram of an example process for analyzing an inventory in order to generate a recommendation for a merchant.

FIG. 11 illustrates a flow diagram of an example process 1100 for analyzing an inventory in order to generate a recommendation for a merchant. At 1102, a payment service 108 identifies a first merchant. In some instances, to identity the first merchant, the payment service 108 may determine that the first merchant is associated with a similar type of business as a second merchant. In some instances, to identify the first merchant, the payment service 108 analyzes a catalog associated with the first merchant and determines that the first merchant offers a specific item for acquisition.

At 1104, the payment service 108 analyzes an inventory associated with the first merchant. For instance, based on identifying the first merchant, the payment service 108 may analyze the inventory of the first merchant, where the inventory stores data indicating quantities of respective items that the first merchant has available. In some instance, the quantities may be associated with one or more physical establishments of the first merchant. In some instances, the quantities may be associated with an online marketplace of the first merchant. Still, in some instances, the quantities may be associated with both the one or more physical establishments and the online marketplace.

At 1106, the payment service 108 determines a first quantity associated with an item. For instance, the payment service 108 may determine the first quantity associated with the item based on analyzing the inventory associated with the first merchant. In some instance, the first quantity includes the quantity of the item that the first merchant currently has available for acquisition. In some instance, the first quantity may include an average quantity of the item that the first merchant has had available for acquisition during a given time period (e.g., a month, year, etc.). Still, in some instances, the first quantity may include the maximum quantity, minimum quantity, or the like that the first merchant has had available for acquisition.

At 1108, the payment service 108 determines a second quantity of the item to recommend to a second merchant based at least in part on the first quantity. For instance, based on the second merchant adding the item to a category of the second merchant, the payment service 108 may determine the second quantity based on the first quantity. In some instances, the payment service 108 determines that the second quantity includes the first quantity. In some instances, the payment service 108 determines the second quantity based on additional factors, such as a size of the first merchant, a size of the second merchant, transaction information (e.g., sales data) associated with the first merchant, transaction information (e.g., sales data) associated with the second merchant, or the like.

At 1110, the payment service 108 sends, to a merchant device, a message recommending the second quantity. For instance, the payment service 108 may send the message to a merchant device associated with the second merchant. The merchant device may receive the message from the payment service 108 and, in response, display the recommendation to the second merchant.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A point-of-sale (POS) device comprising:
   a display;
   one or more processors; and
   one or more computer-readable media storing instructions that, when executed by the one or more processors, cause the one or more processors to perform operations comprising:
     receiving, from one or more computing devices of a payment service, an application that is built using a codebase, wherein the application is operable in at least two modes of operation depending on a type of item to be offered for sale, and wherein the codebase includes at least:
       first code corresponding to a first mode of operation associated with services offered for sale by an entity, wherein the first code is associated with a first functionality that causes the POS device to present a first user interface associated with one or more first input options for inputting information associated with the services; and
       second code corresponding to a second mode of operation associated with goods offered for sale by the entity, wherein the second code is associated with a second functionality that causes the POS device to present a second user interface associated with one or more second input options for inputting information associated with the goods;
     providing, using the display, and based at least in part on operating the application in the first mode of operation, the first user interface associated with the services offered for sale by the entity;
     receiving, via the first user interface, first input associated with a first transaction between the entity and a first customer, the first input indicating at least a service acquired by the first customer during the first transaction;
     updating the first user interface to include information describing the service;
     receiving, via the first user interface, second input for transitioning from operating the application in the first mode of operation to operating the application in the second mode of operation, wherein transitioning from the first mode of operation to the second mode of operation causes a switch from the first user interface to the second user interface;
     transitioning from the first mode of operation to the second mode of operation;
     providing, using the display and based at least in part on transitioning from the first mode of operation to the second mode of operation, the second user interface associated with the goods offered for sale by the entity;
     receiving, via the second user interface, third input associated with a second transaction between the entity and a second customer, the third input indicating at least a good acquired by the second customer during the second transaction; and
     updating the second user interface to include information describing the good.

2. The POS device of claim 1, wherein the codebase further includes third code corresponding to a third mode of operation, the third mode of operation being associated with at least one of additional goods or additional services offered for sale by the entity, wherein the third code is associated with a third functionality that causes the POS device to present a third user interface associated with one or more first input options for inputting information associated with the additional goods or the additional services.

3. The POS device of claim 1, wherein:
   the first code is associated with a first application that is configured with the first mode of operation as a primary mode of operation; and
   the second code is associated with a second application that is configured with the second mode of operation as the primary mode of operation, and
   wherein the application includes either the first application or the second application.

4. The POS device of claim 1, the operations further comprising:
   receiving fourth input indicating that one of the goods or the services offered for sale by the entity is associated with a primary business purpose for the entity; and
   setting a primary mode of operation for the application to include the first mode of operation or the second mode of operation based at least in part on the fourth input.

5. A method comprising:
   operating an application that is built using a codebase and received from a computing device of a payment service, wherein the application is operable in at least two modes of operation depending on a type of item to be offered for sale, and wherein the codebase includes at least:
     first code corresponding to a first mode of operation associated with services offered for sale by a merchant, and wherein the first code is associated with a first functionality causing a point-of-sale (POS) device of the merchant to present a first user interface associated with one or more first input options for inputting information associated with the services; and second code corresponding to a second mode of operation associated with goods offered for sale by the merchant, and wherein the second code is associated with a second functionality causing the POS device of the merchant to present a second user interface associated with one or more second input options for inputting information associated with the goods;

providing, using the POS device, and based at least in part on operating the application in the first mode of operation, the first user interface associated with the services offered for sale by the merchant;

receiving, via the first user interface, first input associated with a first transaction between the merchant and a first customer, the first input indicating at least a service acquired by the first customer during the first transaction;

updating the first user interface to include information describing the service;

receiving, via the first user interface, second input for transitioning from operating the application in the first mode of operation to operating the application in the second mode of operation, wherein transitioning from the first mode of operation to the second mode of operation causes a switch from the first user interface to the second user interface;

transitioning from the first mode of operation to the second mode of operation;

providing, using the POS device and based at least in part on transitioning from the first mode of operation to the second mode of operation, the second user interface associated with the goods offered for sale by the merchant;

receiving, via the second user interface, third input associated with a second transaction between the merchant and a second customer, the third input indicating at least a good acquired by the second customer during the second transaction; and updating the second user interface to include information describing the good.

6. The method of claim 5, further comprising:
transmitting, from the POS device, at least one of transaction information or payment information to the payment service for authorization of payment for the first transaction; and
receiving, by the POS device, a message indicating whether the payment was authorized for the cost of the first transaction from the payment service.

7. The method of claim 5, further comprising:
transmitting, from the POS device, at least one of transaction information or payment information to the payment service for authorization of payment for the second transaction; and
receiving, by the POS device, a message indicating whether the payment was authorized for the cost of the second transaction from the payment service.

8. The method of claim 5, further comprising:
receiving fourth input for transitioning the application to operate in a third mode of operation, the third mode of operation being associated with other goods or services; and
based at least in part on operating the application in the third mode of operation, providing a third user interface for inputting information describing the other goods or services offered for sale at the merchant.

9. The method of claim 5, wherein receiving the first input comprises receiving, via the first user interface, a selection of an option associated with operating the at least one application in the second mode of operation.

10. The method of claim 5, wherein the service selected via the first input is a first service, and wherein receiving the first input further comprises receiving information describing a second service offered for sale at the merchant.

11. The method of claim 5, wherein:
the first code configures the application to operate with the first mode of operation as a primary mode of operation; and
the second code configures the application to operate with the second mode of operation as the primary mode of operation.

12. The method of claim 5, further comprising:
receiving fourth input indicating that a primary business purpose for an entity includes the services offered for sale by the merchant; and
based at least in part on the primary business purpose, setting a primary mode of operation for the application to include the first mode of operation.

13. The method of claim 5, further comprising:
receiving fourth input indicating that a primary business purpose for an entity includes the goods offered for sale by the merchant; and
based at least in part on the primary business purpose, setting a primary mode of operation for the application to include the second mode of operation.

14. An electronic device comprising:
one or more processors; and
one or more computer-readable media storing instructions that, when executed by the one or more processors, cause the one or more processors to perform operations comprising:
operating an application that is built using a codebase and received from a computing device of a payment service, wherein the application is operable in at least two modes of operation depending on a type of item to be offered for sale, and wherein the codebase includes at least:
first code corresponding to a first mode of operation associated with services offered for sale by a merchant and wherein the first code is associated with a first functionality that causes the electronic device to present a first user interface associated with one or more first input options for inputting information associated with the services; and
second code corresponding to a second mode of operation associated with goods offered for sale by the merchant, and wherein the second code is associated with a second functionality causing the electronic device of the merchant to present a second user interface associated with one or more second input options for inputting information associated with the goods;
providing, using the electronic device, and based at least in part on operating the application in the first mode of operation, the first user interface associated with the services offered for sale by the merchant;
receiving, via the first user interface, first input associated with a first transaction between the merchant and a first customer, the first input indicating at least a service acquired by the first customer during the first transaction;
updating the first user interface to include information describing the service;
receiving, via the first user interface, second input for transitioning from operating the application in the first mode of operation to operating the application in the second mode of operation, wherein transitioning from the first mode of operation to the second mode of operation causes a switch from the first user interface to the second user interface;

transitioning from the first mode of operation to the second mode of operation;

providing, using the electronic device and based at least in part on transitioning from the first mode of operation to the second mode of operation, the second user interface associated with the goods offered for sale by the merchant;

receiving, via the second user interface, third input associated with a second transaction between the merchant and a second customer, the third input indicating at least a good acquired by the second customer during the second transaction; and updating the second user interface to include information describing the good.

15. The electronic device of claim 14, the operations further comprising:

based at least in part on operating the application in the first mode of operation, providing the first user interface, wherein the one or more first input options describe the services offered for sale by the merchant; and based at least in part on operating the application in the second mode of operation, providing the second user interface, wherein the one or more third input options describe the goods offered for sale by the merchant.

16. The electronic device of claim 14, the operations further comprising:

transmitting, from the electronic device, at least one of transaction information or payment information to the payment service for authorization of payment for the first transaction; and receiving, by the electronic device, a message indicating whether the payment was authorized for the cost of the first transaction from the payment service.

17. The electronic device of claim 14, wherein:

the first code configures the application to operate with the first mode of operation as a primary mode of operation; and the second code configures the application to operate with the second mode of operation as the primary mode of operation, the operations further comprising:

sending, to the payment service, a request for the application; and receiving, from the payment service, the application.

18. The electronic device of claim 14, the operations further comprising:

receiving fourth input indicating that a primary business purpose for the merchant includes the services offered for sale by the merchant; and setting a primary mode of operation for the application to include the first mode of operation based at least in part on the primary business purpose.

19. The electronic device of claim 14, the operations further comprising:

transmitting, from the electronic device, at least one of transaction information or payment information to the payment service for authorization of payment for the second transaction; and receiving, by the electronic device, a message indicating whether the payment was authorized for the cost of the second transaction from the payment service.

20. The electronic device of claim 14, wherein receiving the second input comprises receiving, via the first user interface, a selection of an option associated with operating the application in the second mode of operation.

* * * * *